Aug. 13, 1946.  R. H. CLARK  2,405,686
MACHINE TOOL
Filed June 11, 1943  10 Sheets-Sheet 7
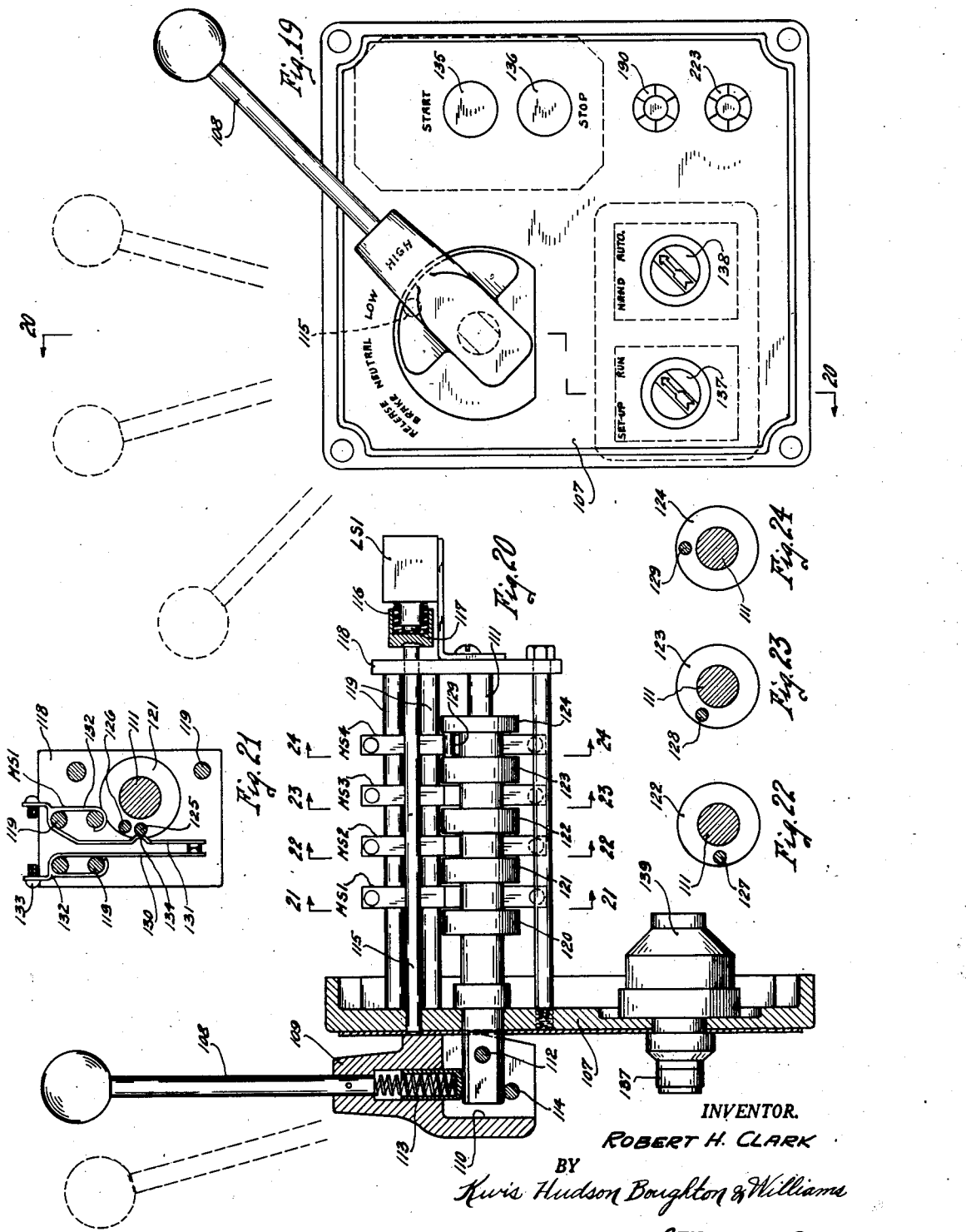
INVENTOR.
ROBERT H. CLARK
BY
Kwis Hudson Boughton & Williams
ATTORNEYS

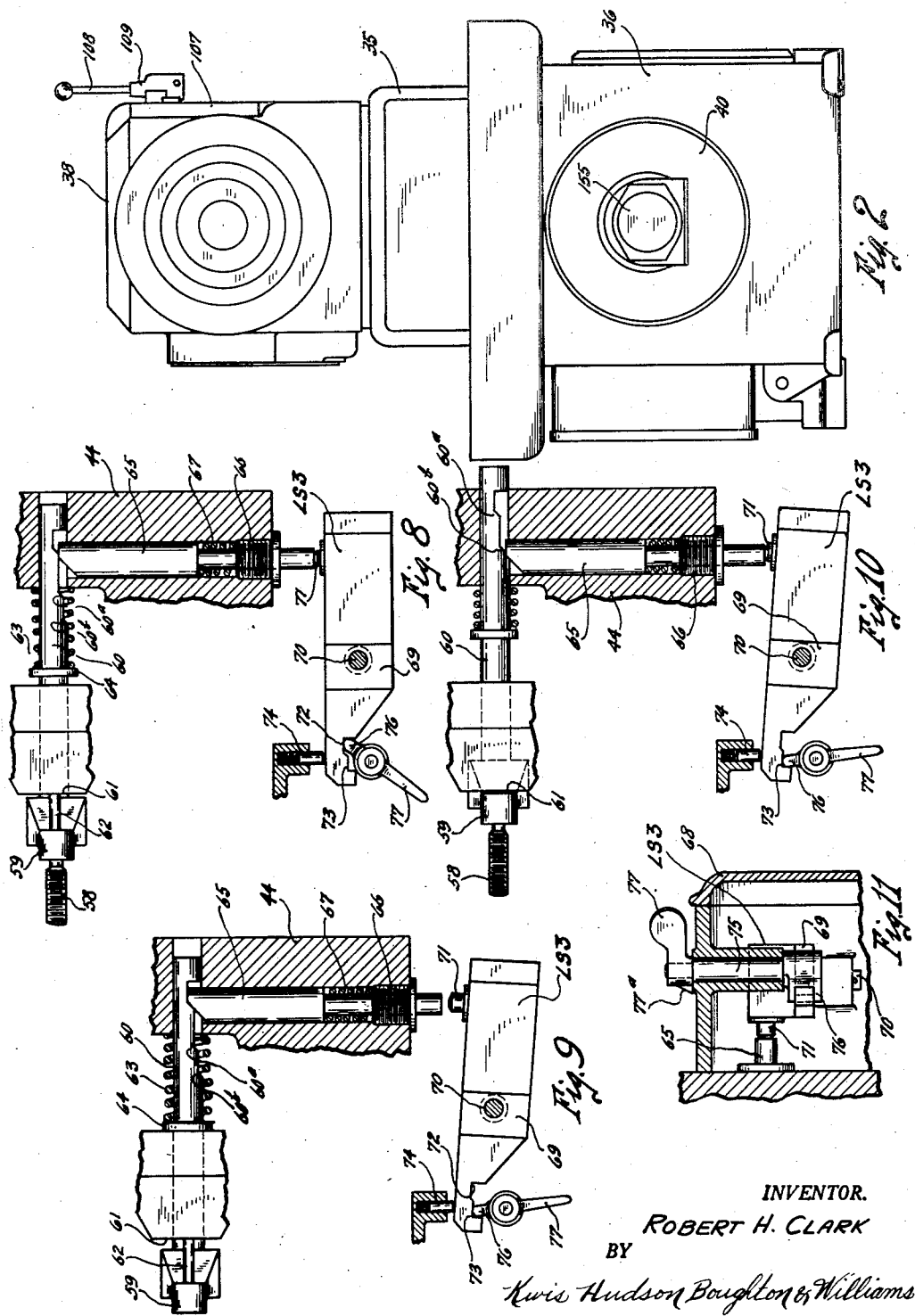

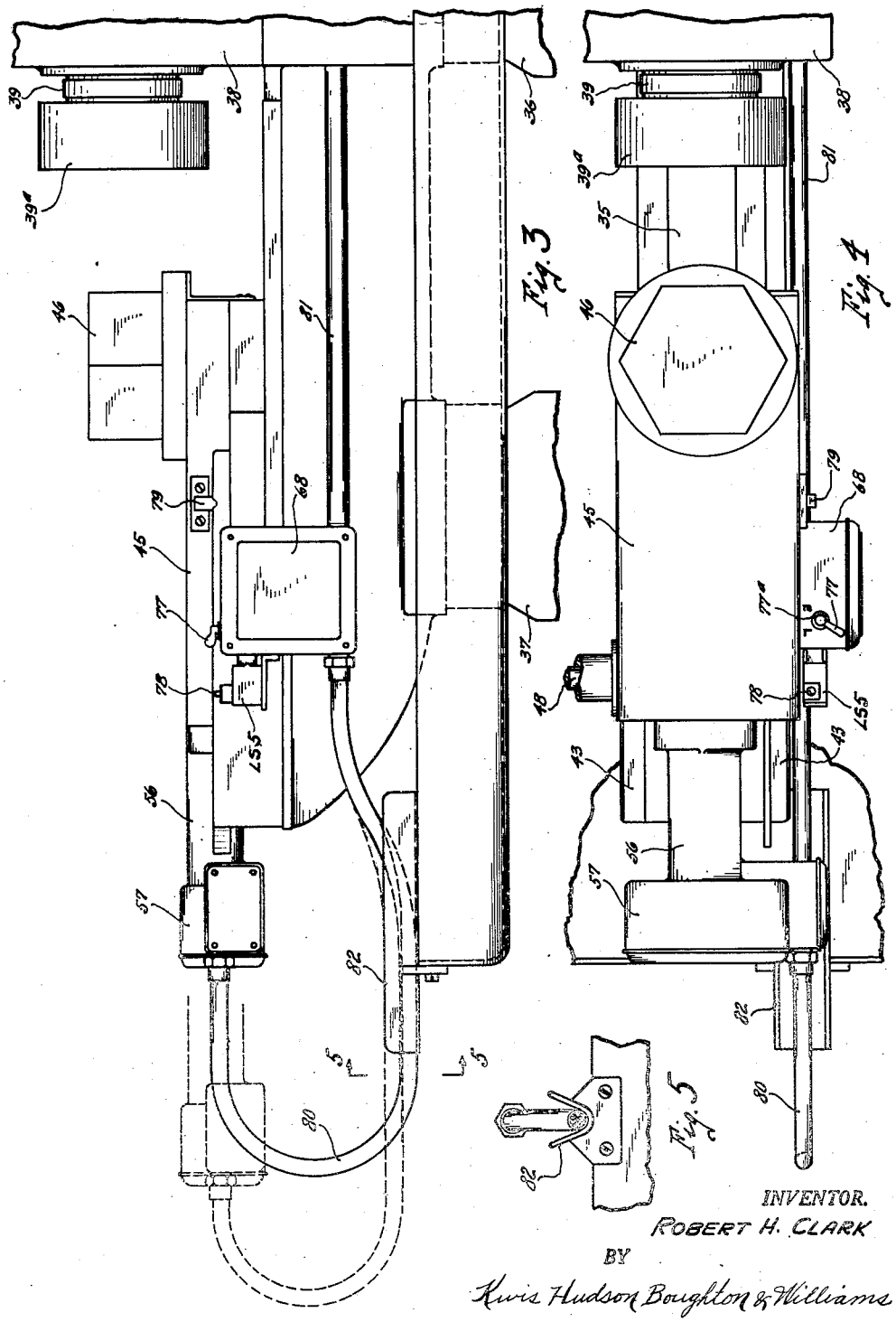

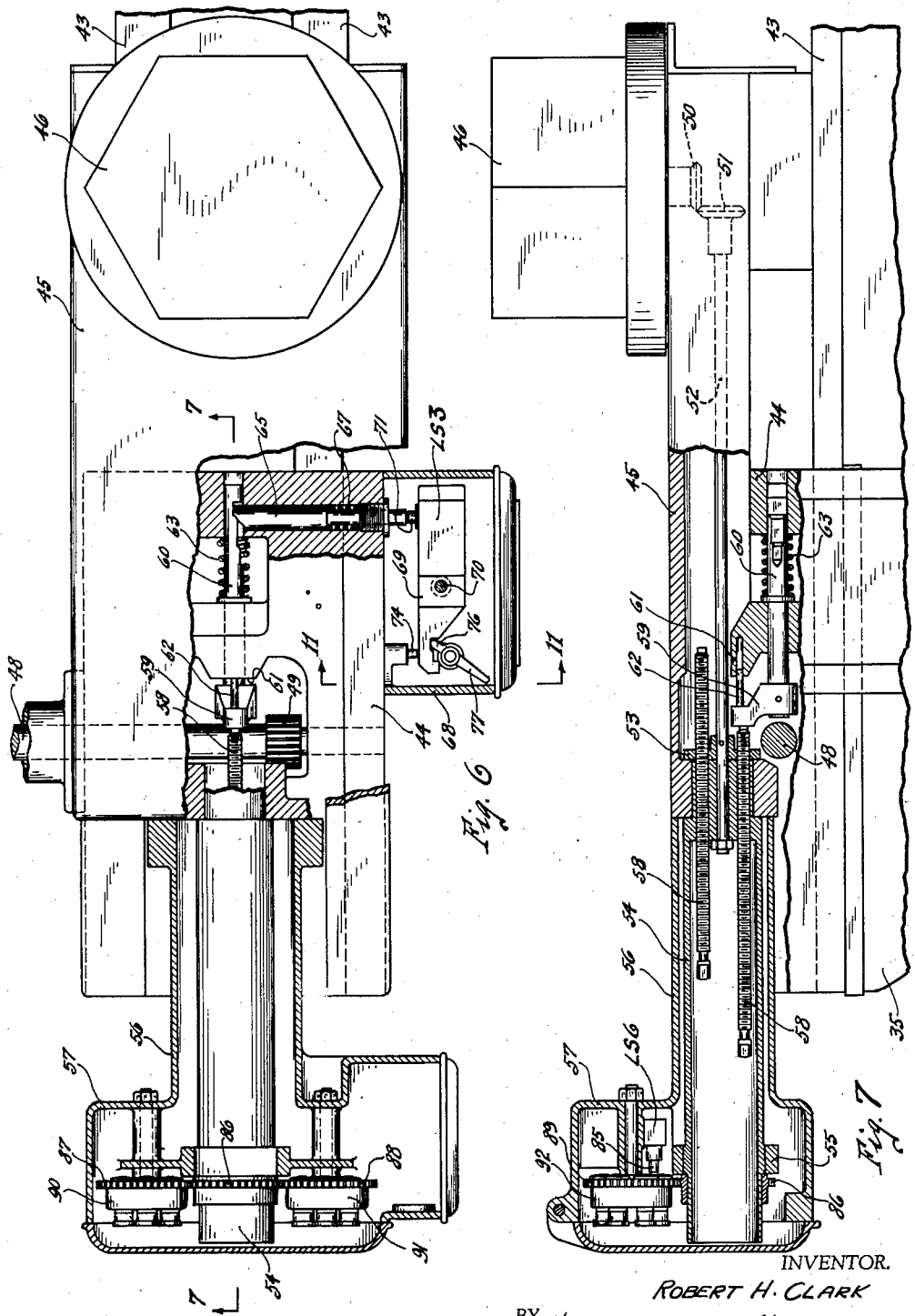

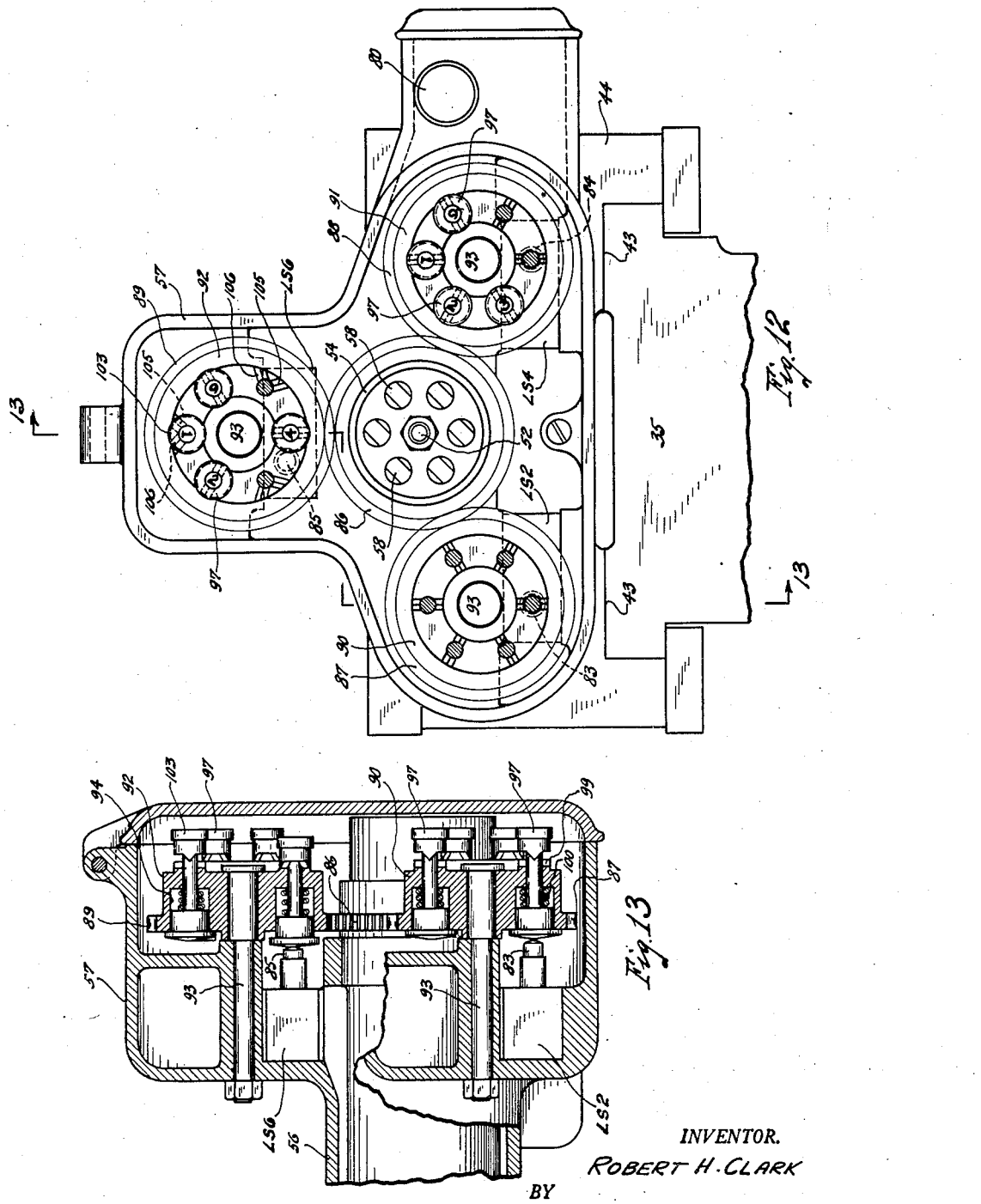

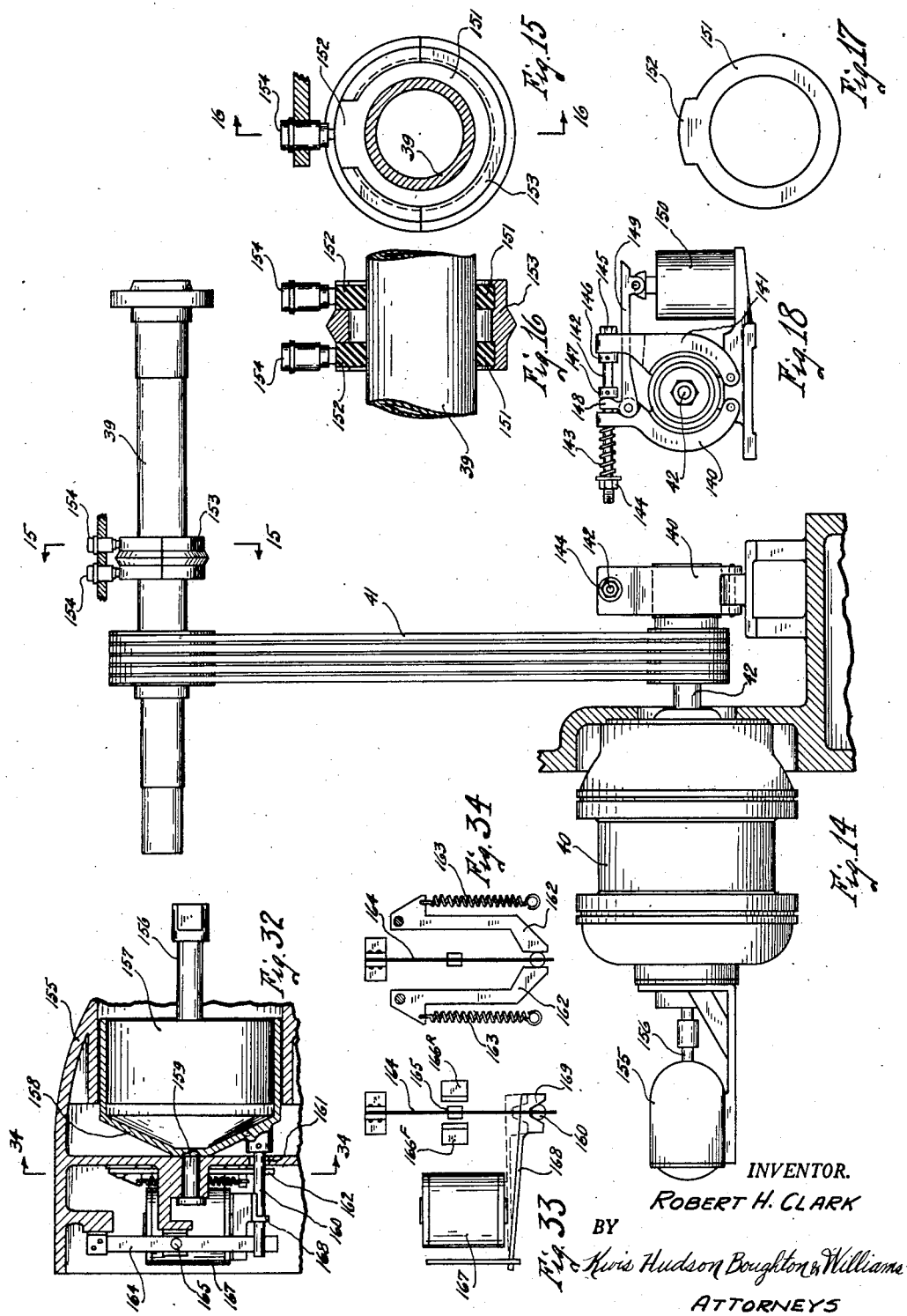

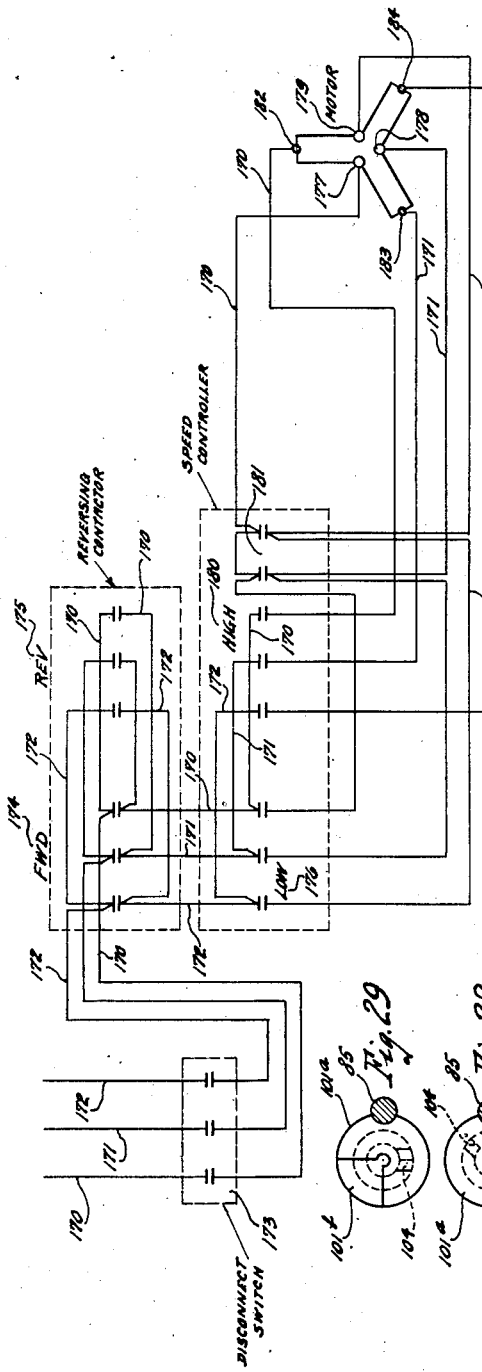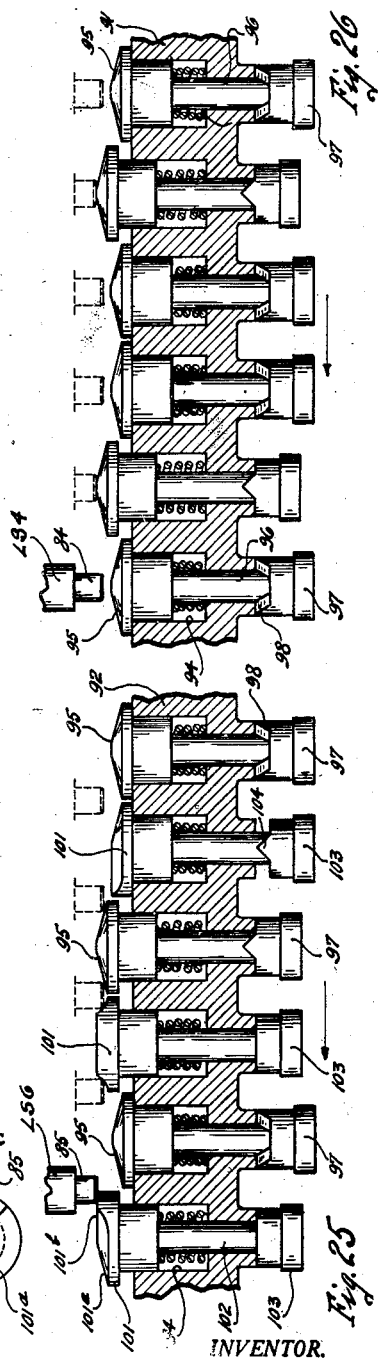

Patented Aug. 13, 1946

2,405,686

UNITED STATES PATENT OFFICE 2,405,686

MACHINE TOOL

Robert H. Clark, Solon, Ohio, assignor to The Warner & Swasey Company, Cleveland, Ohio, a corporation of Ohio Application June 11, 1943, Serial No. 490,468

12 Claims. (Cl. 29—64)

This invention relates to a machine tool and particularly to a machine tool adapted to perform rapid machining and threading operations upon relatively small work pieces, although the invention may be advantageously employed in machine tools for machining different types of work pieces.

An object of the invention is to provide a machine tool which is so constructed and its operations so controlled that it will function in an improved, rapid and efficient manner and thus enable the work pieces to be economically produced.

Another object of the invention is to provide in a machine tool of the type having an electric motor for driving the spindle at varying speeds in opposite directions, improved means for controlling the speed and direction of motor operation.

A further object is to provide in a machine tool of the type having a variable speed spindle and a slide provided with an indexible turret, improved means for controlling the speeds, the direction of movement and the starting and stopping of the spindle and which means is actuated in part by the indexing of the turret and in part by the movements of the slide.

Another and important object is to provide in a machine tool of the type having a reversible variable speed electric motor for driving the spindle and a slide provided with an indexible turret, improved means for controlling the speeds, the direction of rotation and the starting and stopping of the motor for each step of a work cycle and which means can be preset and then actuated in part by the indexing of the turret and in part by the movements of the slide.

A still further object is to provide in a machine tool such as specified in any of the above named objects improved means for plugging the motor when the control circuit thereto is interrupted to slow down the coasting of said motor and also improved means for braking the motor to stop the rotation of the spindle.

A still further object is to provide the improved means specified in the last object, together with means for stopping and locating the spindle in a predetermined position for purposes of loading and unloading.

Further and additional objects and advantages not specifically referred to above will become apparent during the detailed description of an embodiment of the invention and which description is to follow. Referring to the accompanying drawings illustrating said embodiment of the invention:

Fig. 2 is an end elevational view of the machine tool shown in Fig. 1 and is taken looking at the left hand end of Fig. 1.

Fig. 3 is a fragmentary rear elevational view of the machine tool shown in Figs. 1 and 2 but on a larger scale.

Fig. 4 is a fragmentary top plan view of the machine tool shown in Fig. 3.

Fig. 5 is a detail view taken on line 5—5 of Fig. 3 looking in the direction of the arrows.

Fig. 6 is a fragmentary view similar to Fig. 4 but on a larger scale and shows the construction of the machine tool partly in top plan and partly in section.

Fig. 7 is a front view of the portion of the machine tool shown in Fig. 6 and is partly in elevation and partly in section, the section being taken substantially on line 7—7 of Fig. 6 looking in the direction of the arrows.

Fig. 8 is a detached view of a portion of the mechanism shown in Fig. 6 and is on a larger scale with the parts shown in different relationship.

Fig. 9 is a view similar to Fig. 8 but shows the parts in different relationship.

Fig. 10 is a view similar to Figs. 8 and 9 but shows the parts in a still different relationship.

Fig. 11 is a detached detail sectional view on a larger scale taken on line 11—11 of Fig. 6 looking in the direction of the arrows.

Fig. 12 is an end view taken from the left hand end of Fig. 6 on a larger scale and with the end cover plate removed.

Fig. 13 is an irregular sectional view taken substantially on line 13—13 of Fig. 12 looking in the direction of the arrows.

Fig. 14 is a detached elevational view of the spindle and the drive therefor and includes a braking mechanism and a plugging mechanism for the motor.

Fig. 15 is a sectional view on a larger scale than Fig. 14 and is taken substantially on line 15—15 of Fig. 14 looking in the direction of the arrows.

Fig. 16 is a sectional view taken substantially on line 16—16 of Fig. 15 and looking in the direction of the arrows.

Fig. 17 is a detached elevational view of a part shown in section in Fig. 15.

Fig. 18 is an end elevational view of the motor spindle and brake mechanism and is taken looking at the right hand end of a portion of Fig. 14.

Fig. 19 is a detached elevational view on a larger scale of the control panel shown in Fig. 1, with certain positions of the control lever indicated by dash lines.

Fig. 20 is a sectional view taken on line 20—20 of Fig. 19 looking in the direction of the arrows.

Fig. 21 is a detail sectional view taken substantially on line 21—21 of Fig. 20.

Figs. 22, 23 and 24 are detached views of a part shown in Fig. 20 and are taken, respectively, along line 22—22, 23—23 and 24—24 of Fig. 20 looking in the direction of the arrows.

Fig. 25 is a developed view of the upper cam disk carrying drum shown in Fig. 12.

Fig. 26 is a developed view similar to Fig. 25 but illustrating one of the two identical lower cam disk carrying drums of Fig. 12.

Fig. 27 is a top plan view of the most left hand cam disk shown in Fig. 25, with the switch button indicated in section.

Fig. 28 is a top plan view of the third from the left cam disk shown in Fig. 25, with the switch button indicated in section.

Fig. 29 is a top plan view of the fifth from the left cam disk shown in Fig. 25, with the switch button indicated in section.

Fig. 30 is a wiring diagram of the speed and reverse control circuits for the motor.

Figure 31:
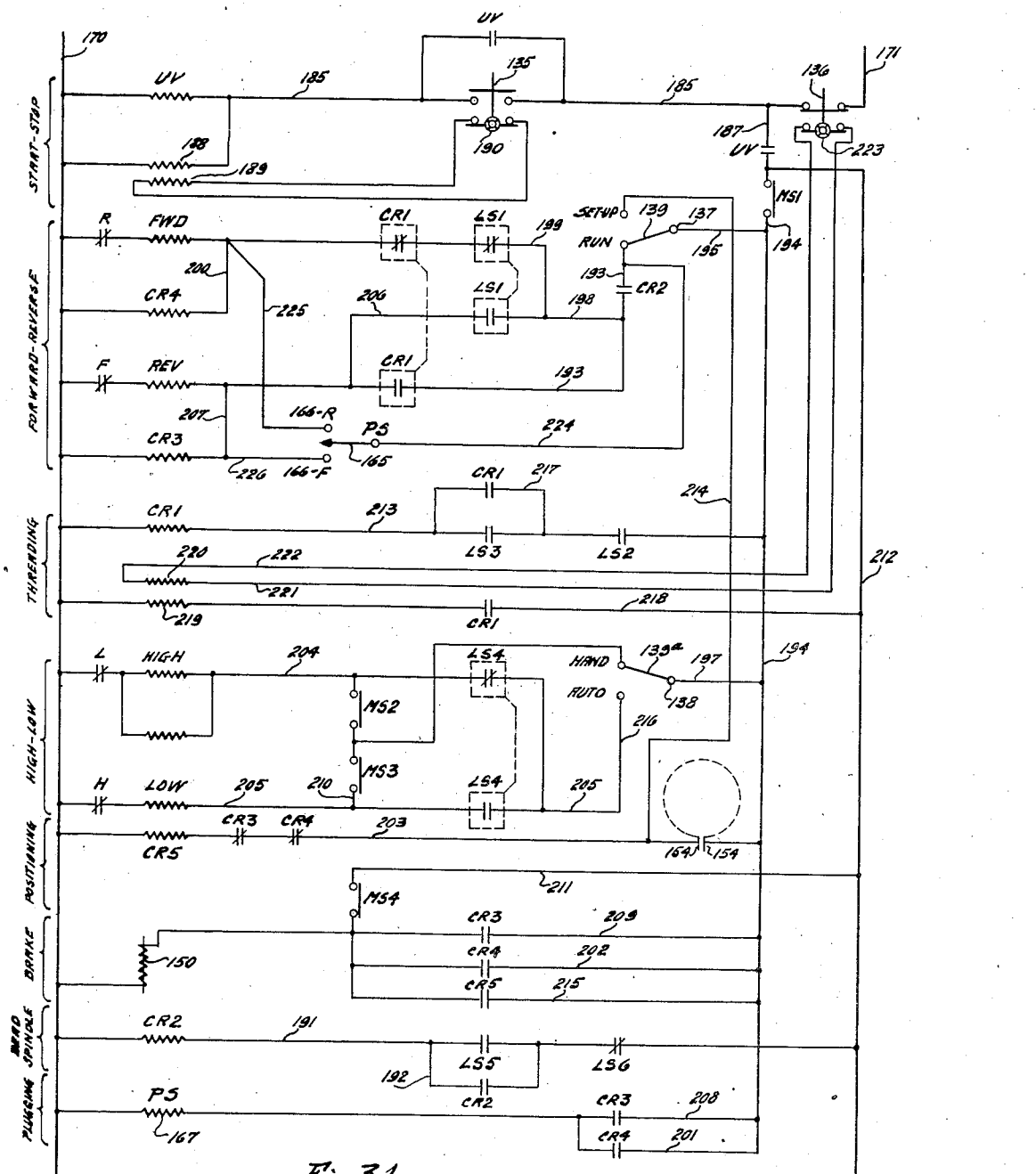

Fig. 31 is a wiring diagram of the electrical control circuits for the machine laid out in accordance with the standardized practice of the American electrical industry.

Fig. 32 is a sectional view through a commercial form of plugging switch which can be operatively associated with the motor and included in the control circuits.

Figure 35:
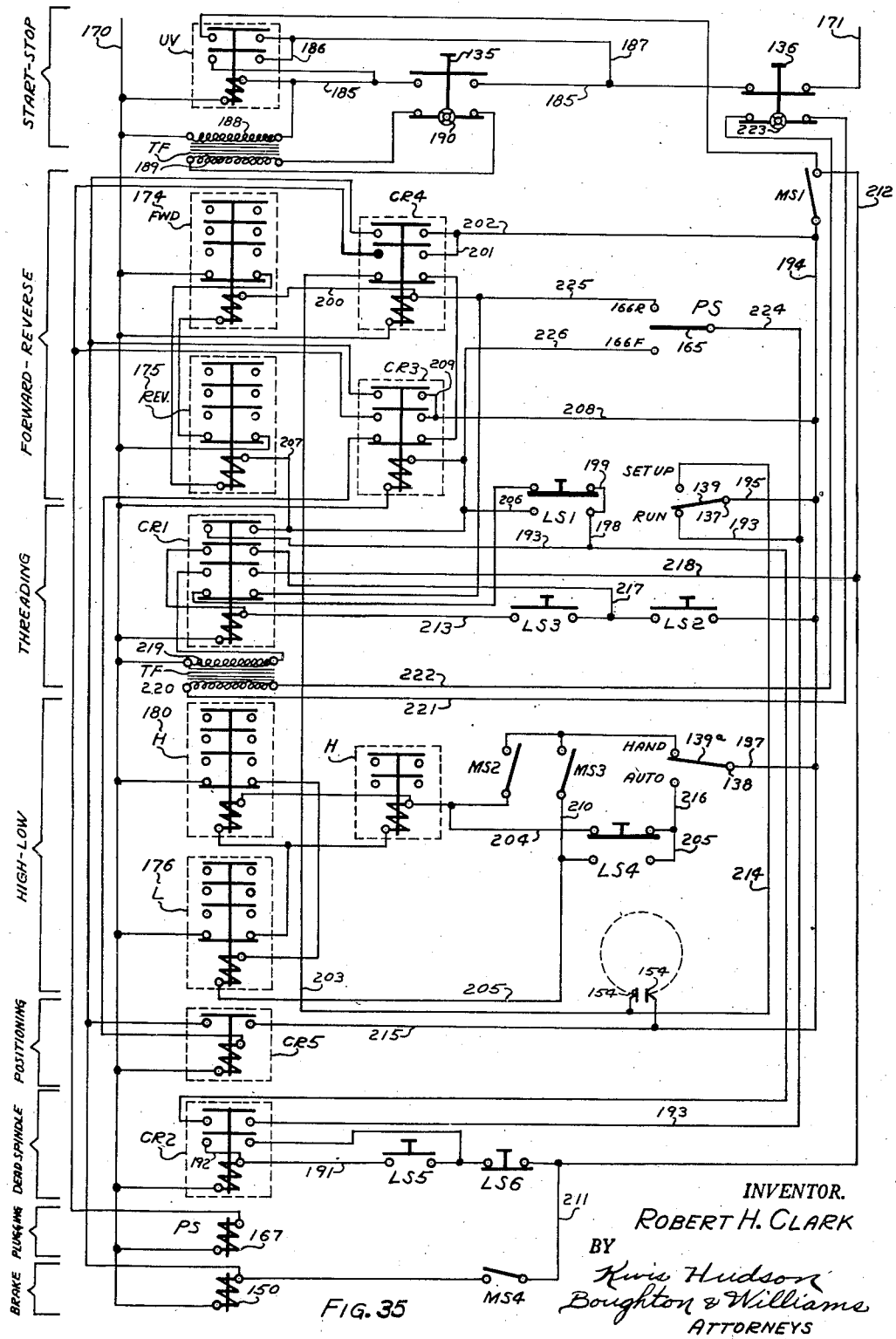

Fig. 33 is a detached view of certain of the parts of the plugging switch and is taken looking from the left hand end of Fig. 32, Fig. 34 is a detached sectional view of certain parts taken substantially along line 34—34 of Fig. 32, and Fig. 35 is a wiring diagram of the electrical control circuits for the machine corresponding to the control circuits disclosed in Fig. 31 but laid out in accordance with Patent Office standards and requirements.

Figure 1:
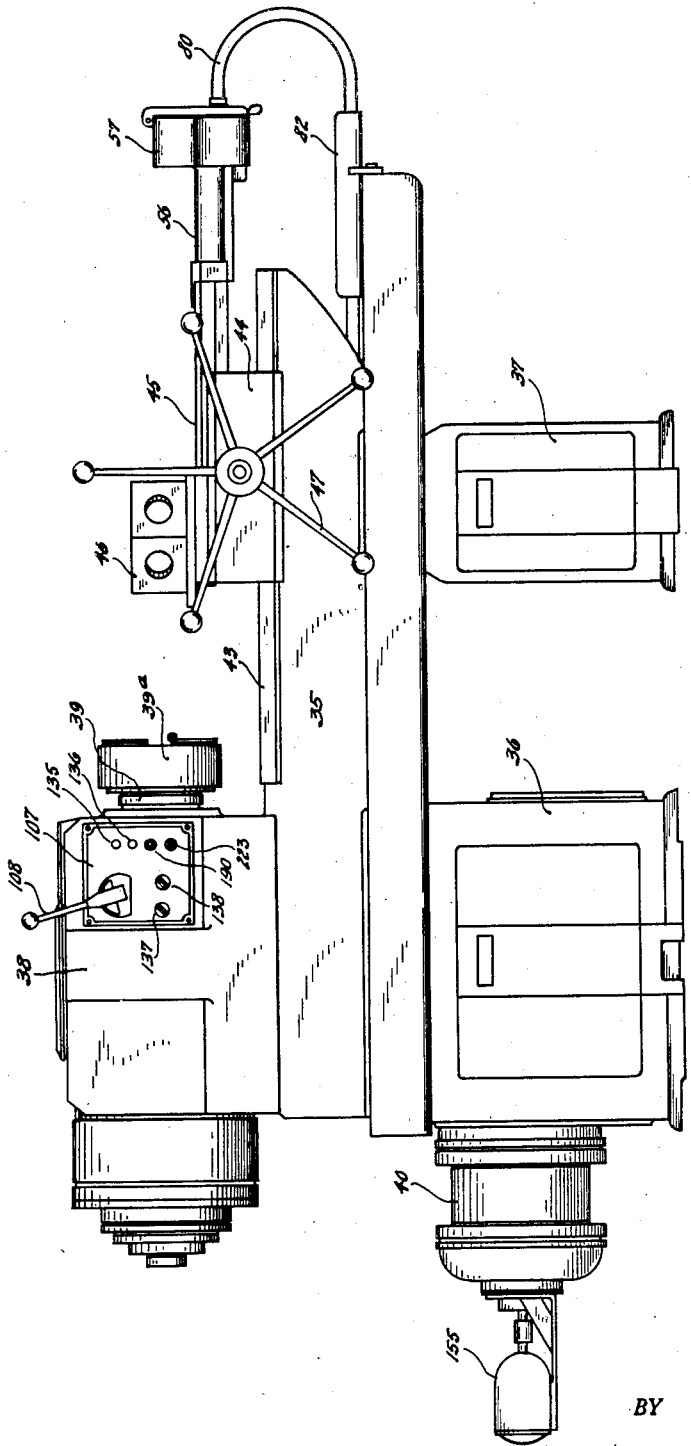
Fig. 1 is a front elevational view of a machine tool to which the invention has been applied, the machine tool being shown for purposes of illustration as a turret lathe wherein the slide is manually moved and the turret is manually indexed.

Referring to Fig. 1 the machine tool shown therein is a turret lathe and comprises a bed 35 supported on spaced pedestals 36 and 37. A headstock 38 is carried by one end of the bed 35 and rotatably supports the work spindle 39 and chuck 39a and which spindle is driven by a reversible variable speed electric motor 40 supported by the pedestal 36 and operatively connected with the spindle 39 by means of belts 41 extending around a pulley on the motor shaft 42 and a pulley on the work spindle 39, see Figs. 1 and 14.

The bed 35 is provided with longitudinally extending ways 43 which are parallel to the work spindle 39 and adjustably support a base 44 on which base slides a turret slide 45 having thereon an indexible turret 46. The base 44, in a manner well known in the art, can be moved to and clamped in adjusted position on the ways 43, while the slide 45 is manually moved on the ways of the base by means of the turnstile 47 fixed to a shaft 48 which carries a pinion 49, see Fig. 6, and is rotatably supported in the base with the pinion meshing with a rack carried by the slide as is well known in the art.

The turret 46 is indexed automatically by the movement of the slide and is locked and clamped by well known mechanism for that purpose and therefore not illustrated herein. The central stud of the indexible turret 46 extends into the slide 45 and has fixed thereto a bevel gear 50 which meshes with a bevel gear 51 fixed to one end of a shaft 52 that is parallel to the ways 43. The shaft 52 extends rearwardly within the slide 45 and passes through and is fixed to a stop roll collar 53, see Fig. 7. The collar 53 abuts against one side of a bearing boss formed in the slide 45 and said collar 53 is rigidly connected to the end of a reduced portion of a stop roll 54 and which reduced portion rotatably interfits said bearing boss while the shoulder on the stop roll at the inner end of the reduced portion engages the opposite side of the bearing boss from the collar 53, wherefore the stop roll is held against relative endwise movement with respect to the slide 45 but can rotate relative thereto.

The stop roll 54 rearwardly of the reduced portion thereof is in the form of a sleeve and the rear end of the stop roll is rotatably supported in a bearing boss 55 formed in a supporting bracket attached to the end of the slide and having a sleeve portion 56 surrounding the sleeve portion of the stop roll and an integral cam disk supporting drum housing portion 57 for a purpose later to be explained.

The stop roll collar 53 is provided with a plurality of circularly spaced openings concentric to the shaft 52 and aligning with threaded bores formed in the reduced portion of the stop roll. Adjustable stop screws 58 extend through the threaded bores of the stop roll and through the openings in the collar 53 and can be adjusted longitudinally relative to the stop roll by means of wrench heads formed on the stop screws within the sleeve portion of the stop roll. The stop screws will correspond in number to the different indexed positions of the turret and it will be noted that as the turret is indexed the stop roll will be simultaneously indexed through the beveled gears 50, 51 and the shaft 52 to bring the stop screws successively in line with a movable stop member 59.

The stop member 59 is fixed to a cam rod 60 which is slidably supported in a portion of the base and which portion is provided with a positive stop lug 61 against which the movable stop member 59 abuts after it has been moved by the stop screw which is in alignment therewith. The positive stop lug 61 is provided with a recess which slidably receives a pin 62 carried by the movable stop member 59, wherefore said member and the rod 60 are held against rocking movement.

It will be seen that when the slide 45 moves forwardly toward the chuck 39a carried by the work spindle 39 the movable stop member 59 will be engaged by one of the stop screws 58 when the slide approaches its limit of forward movement and during the remainder of the forward movement of the slide for non-threading operations the movable stop member 59 will be moved into engagement with the positive stop lug 61 and the forward movement of the slide is then positively arrested. This movement of the movable stop member 59 compresses the coil spring 63 which surrounds the rod 60 between a collar 64 fixed to the rod and a part of the base 44. The rod 60 has its right hand end, as viewed in the drawings, slidably supported in a bore formed in the base 44 for a purpose later to be pointed out. The cam rod 60 is provided with a stepped recessed cam portion for the purpose of controlling the motor 40 during threading operations, with the lowermost part of said portion connected to the first step by an inclined camming surface 60a, while said first step is connected to the second step by a similar inclined camming surface 60b, see Figs. 6, 8, 9 and 10.

The base 44 is also provided with a bore which communicates perpendicularly with the bore in which the cam rod 60 slides and which bore slidably supports a cam plunger 65 which has a reduced portion extending through a shouldered bushing 66 and outwardly of the base 44, said bushing serving as an abutment for one end of a coil spring 67 which surrounds the reduced portion of the plunger and has its opposite end abutting the enlarged portion thereof, as clearly shown in the drawings.

The reduced portion of the cam plunger 65 extends outwardly of the bushing 66 in the base 44 at the rear of the machine and into a housing 68 secured to the rear side of the base. An arm 69 is pivotally supported at 70 in the housing intermediate the ends of the arm and said arm carries a switch LS3 which is actuated by a switch button 71 axially aligned with the cam plunger 65. The switch LS3 is located on one side of the pivot 70 for the arm 69 and said arm on the opposite side of said pivot is provided in its edge with a stepped holding notch formed of two portions 72 and 73. A spring pressed plunger 74 supported internally of the housing 68 contacts the inner edge of the arm 69 and normally acts to rock said arm about the pivot 70 in an anticlockwise direction, as viewed in the drawings, and hold the arm against a part later to be referred to.

The housing 68 is provided with an internal bearing boss which rockably supports the vertically extending shaft 75 which has on its lower end a finger portion 76 and on its upper end a thumb lever 77, the hub of which is provided with a pointer portion 77a that cooperates with indicia indicating the two different operative positions of the finger portion 76, namely, the letters "L" and "E" representing, respectively, "late" and "early," see Figs. 4 and 11.

The adjustments provided for by the thumb lever 77 refer to early and late threading operations. As will later be explained other control mechanism functions in conjunction with the switch LS3 for threading operations. The finger portion 76 of the shaft 75 extends into the recess forming the stepped holding portions 72 and 73.

It will be seen that when the thumb lever is in the position shown in Figs. 6 and 8 the finger portion 76 is in the holding recess 72 and the lever arm 69 is substantially parallel to the cam rod. This is the "E" position and will be used when the threading operation involves the use of a solid tap or solid die. It will be noted by reference to Fig. 6 that when the lever arm 69 is in the position just referred to and the plunger 65 extends into the deepest portion of the cam recess of the rod 60 the reduced end of the plunger is contacting the switch button 71 but is not depressing said button. It will further be noted that during a threading operation when a stop screw 58 has contacted and moved the abutment member 59 and shifted the rod 60 from the position shown in Fig. 6 to the position shown in Fig. 8 the plunger 65 has been moved by the inclined surface 60a to compress the spring 67 and to depress the switch button 71 to actuate the switch LS3 carried by the arm 69 to reverse the motor 40.

It will be noted that after the parts are in the position shown in Fig. 8 the movable abutment member 59 is still out of contact with the positive stop lug 61. The spindle will coast in its forward rotation causing a continued forward movement of the slide due to the threading engagement between the tool and the work piece. When the switch LS3 is actuated to effect a reversal of the motor 40, the threaded tool backs off and disengages itself from the work piece when the motor rotates in the reverse direction, while the operator assists the rearward movement of the slide during the backing off of the tool by manually turning the turnstile 47. It will be understood that the amount of movement of the slide due to the coasting of the spindle depends upon the coarseness or fineness of the thread being cut on the work piece, since the slide will move farther in the case of a coarse thread for the same number of coasting revolutions than it would in the case of a fine thread. If the operator finds during the setup of the machine that the thread cut on the work piece is too short or too long he may adjust the stop screw 58 to cause the latter to engage the movable stop member 59 earlier or later as the case may be.

In the use of collapsible taps or collapsible dies for threading a work piece the motor 40 can be reversed at a later point than was the previously described case, since the collapsing of the tap or die terminates the thread cutting and therefore the coasting of the motor does not cause any forward movement of the slide. In the instance just referred to the operator turns the thumb lever 77 to bring the pointer into line with the letter L, indicating late operation of the switch LS3 and such movement of the thumb lever brings the parts into the relationship shown in Fig. 9.

It will be seen that the positioning of the thumb lever 77 in the manner stated has caused the finger 76 to move out of the holding recess 72 and into the holding recess 73 of the lever arm 69, with the result that said arm has been rocked in a clockwise direction from the position shown in Fig. 8 to the position shown in Fig. 9 and which movement of the arm compresses the spring plunger 74 and moves the switch button 71 out of contact with the extended end of the plunger 75, although the inner end of said plunger is in the deepest portion of the cam recess in the rod 60. Consequently when the slide is moving forwardly and the stop screw 58 contacts the movable abutment member 59 and shifts the rod 60 to compress the spring 63 the plunger 65 will travel up the inclined surface 60a and onto the first step and this movement of the plunger 65 brings the extended end of the plunger into contact with the switch button 71 but does not depress said button. The forward movement of the slide continues and the rod 60 is further shifted with the result that the end of the plunger rides up the inclined surface 60b and onto the second step, wherefore the extended end of the plunger depresses the switch button 71 and actuates the switch LS3 as indicated in Fig. 10. This actuation of the switch LS3 effects a reversal of the motor 40. At the time that the switch LS3 is actuated to reverse the motor 40 the collapsible tap or die has completed its threading operation and will collapse in the usual manner, wherefore the threaded relationship between the threaded tool and the work is terminated and consequently any coasting of the motor and the spindle before reversing will not result in any further forward movement of the slide.

The switch box or housing 68 has fixed to its outer and left hand side, as viewed in Fig. 3, a switch LS5, the switch button 78 of which is depressed momentarily at a predetermined point in the forward movement of the slide by a dog 79 fixed to the side of the slide, see Fig. 3. The electrical conduits from the switches LS3 and LS5 extend from the switch box 68 through a flexible cable 80 to the cam disk supporting drum housing portion 57 where said conduits are properly connected to three switches later to be referred to contained within the housing portion 57. It will be understood that the switches LS3 and LS5 are also suitably connected to the motor 40 by electrical conduits located within the tube 81 extending from the switch box 68 to the pedestal 36 located beneath the headstock. The end of the flexible cable 80 which is attached to the housing portion 57 moves with the slide 45, as indicated by full and dash lines in Fig. 3 and said cable is guided and supported in a V-shaped support 82 secured to a fixed part of the machine in this instance the pan.

The three switches referred to above as being contained in the housing portion 57 are indicated in Fig. 12 at LS2, LS4 and LS6, the switches LS2 and LS6 also being indicated in Fig. 13. The three switches are each provided, respectively, with a switch button indicated at 83, 84 and 85. The switches LS2, LS4 and LS6 are actuated by the mechanism now to be described.

The stop roll 54 has a gear 86 fixed to it within the housing portion 57 and said gear meshes with three gears 87, 88 and 89. The gears 87, 88 and 89 are formed on similar cam disk supporting drums 90, 91 and 92 and said drums are rotatably supported within the housing 57 on shafts 93 mounted in bosses formed interiorly of the housing, see Figs. 6, 7, 12 and 13. It will be observed that the switch buttons 83, 84 and 85 of the switches LS2, LS4 and LS6 are located adjacent to the left hand face of the drums 90, 91 and 92 as viewed in Figs. 12 and 13 and it will be seen that said buttons are in position to cooperate with instrumentalities carried by the drums and later to be explained.

The drums 90, 91 and 92 are each provided in this instance with six equally spaced circularly arranged recesses 94 and which recesses face toward the switch buttons 83, 84 and 85. One of the recesses 94 of each of the drums 90 and 91 will be aligned, respectively, with the switch buttons 83 and 84 for each indexed position of the turret 46, see Figs. 12, 13 and 26, while for each such indexed position the switch button 85 will be located intermediate two of the recesses 94 of the drum 92, see Figs. 12 and 25.

The drums 90 and 91 each carry six identical cam disks 95 (see Figs. 6 and 26) formed on shouldered portions of shafts 96 and which portions slidably interfit the recesses 94 of the drums while the shafts slidably pass through openings in the drums. On the outer end of each shaft 96 there is formed a button 97 which is provided on its inner face with a diametrically extending V-shaped ridge 98 which is adapted to cooperate when in an aligned position with a complementary groove 99 formed in the drum 90 or 91. A coil spring 100 surrounds each shaft 96 within the recess 94 and acts normally to urge the shoulder portion and cam disk 95 outwardly of the recess 94 and toward the switch button 83 or 84.

Each cam disk 95 can be held in its innermost or withdrawn position against the action of the spring 100 by turning the respective button 97 to position the V-shaped ridge 98 out of registry with the complementary groove 99, so that said ridge bears against the outer surface of the boss on the drum, see Figs. 13 and 26, and at this time such cam disk is in an inactive position with respect to its cooperating switch button. In order to place a cam disk in switch button actuating position its button 97 is turned to bring the V-shaped ridge 98 into registry with the complementary groove 99 on the cam drum, wherefore the spring 100 forces the cam disk outwardly of the recess 94 and into position to actuate the switch button when the drum is indexed.

Referring to Fig. 26, it will be observed that four of the cam disks 95 are shown therein in inactive position, while two of said disks are shown therein in switch actuating position. It will be understood that in the arrangement shown in Fig. 26 the switch LS4 will be actuated only for two indexed positions of the turret and for the other four indexed positions said switch will not function.

It will be noted that the cam disks 95 are on their outer faces of conical configuration, wherefore when the drum 91 is indexed the cam disks which are in switch actuating position will cam or depress the switch button 84.

It will also be understood that when the drum 91 is again indexed to move the cam disk 95 out of contact with the switch button 84 the latter will be spring returned to its normal extended position.

Although in the foregoing description relating to Fig. 26 reference has been made to the cam drum 91, it will be understood that it applies also to the cam drum 90 and the cam disks 95 carried thereby, since both drums 90 and 91 and their cam disks are of identical construction and the corresponding disks of the drums are identically adjusted in the present illustration, although they may be individually adjusted in different arrangements to suit various operating conditions.

The drum 92 is provided in three of its recesses with cam disks 95, see Fig. 25, and the buttons 97 connected to these cam disks 95 are of identical construction with the buttons 97 of the previously referred to cam disks 95 and said cam disks can be positioned in either an inactive or an active position by means of ridges 98 on the buttons and grooves 99 on the outer faces of the bosses of the cam drum 92.

It will be observed by reference to Fig. 25 that when one of the cam disks 95 carried by the drum 92 is in switch actuating position and the indexing of the drum brings said cam disk into contact with the switch button 85 to actuate the switch LS6 the depression of the switch button 85 is a momentary one and the cam disk comes to rest in a position which allows the switch button 85 to return to its extended position. This arrangement is due to the fact that the switch button 85 when the drum 92 is in indexed position is located intermediate adjacent recesses 94 of the drum 92 and that the switch LS6 need only be actuated momentarily for a reason later to be explained.

The drum 92 in the remaining three of its recesses 94 is provided with cam disks 101 which are of different construction than are the cam disks 95 for a purpose which will be explained. The cam disks 101 are formed on shouldered portions of shafts 102 similar to the shafts 96 and are provided on their ends with buttons 103. The buttons 103 differ from the buttons 97 in that the former are provided on their sides adjacent to the drum 92 with a single V-shaped radially extending ridge 104 and which ridge can be placed in registry with either one of two angularly disposed radially extending complementary V-grooves 105 and 106 formed in the outer surface of the drum 92, see Fig. 12, wherefore it will be seen that the cam disks 101 can be placed in either one of two extended positions depending upon which of the grooves 105 or 106 is placed in registry with the ridge 104. The cam disks on their outer ends consist of a segmental portion 101a of conical configuration and a segmental portion 101b of flat configuration. When a button 103 is positioned with the ridge 104 engaging in groove 106 then the cam disk 101 is in the position of the most left hand cam disk 101 of Fig. 25 and as shown in the plan view in Fig. 27 the switch button 85 is resting on the flat segmental portion 101b of the cam disk and is held depressed. This is the position which any one of the cam disks 101 may be brought to for a purpose later to be explained. When the button 103 of a particular cam disk 101 is turned to bring the ridge 104 into registry with the groove 105 that particular cam disk 101 will take the position indicated for the middle cam disk 101 in Fig. 25. When the cam disk 101 is in the position just referred to it will be extended so that as the drum 92 is indexed said cam disk 101 will momentarily depress the switch button 85 since the latter rides up the conical portion 101a across the center of the cam disk 101 and then down the other conical side of the disk as indicated by dash lines in Fig. 25 and as shown in plan view in Fig. 28, it being noted that the flat portion 101b of the disk is now at right angles to the location it had in Fig. 27 and hence said flat portion now will not hold the switch button depressed. The purpose of the arrangement of the middle cam disk 101 of Fig. 25 as just referred to will be explained hereinafter.

The most right hand cam disk 101 of Fig. 25 is shown in the third position of adjustment which can be imparted to the cam disks 101, namely, said cam disk is withdrawn to an inactive position wherein it will not contact the switch button 85 to depress the same as the cam drum 92 is indexed and at this time the ridge 104 of the button 103 is contacting the face of the boss of the drum 92 and holding the cam disk in inactive position (see Fig. 29).

As shown in Fig. 1 a control panel 107 is secured to the front side of the headstock 38 and said control panel is shown in Fig. 19 on a larger scale. The control panel 107 carries a master switch control lever 108 which is fixed in a lever bracket 109. The lever bracket 109 in its lower portion and adjacent to the panel 107 is provided with a recess 110 into which extends the projecting end of a switch shaft 111 later to be referred to. A bearing pin 112 is carried by the bracket 109 and extends through the shaft 111 and forms a pivot about which the bracket and the lever 108 can be rocked from the full line position of Fig. 20 to the dash line position thereof, it being noted that the lower right hand portion of the bracket 109 is beveled to permit this rocking movement and to form a stop to limit the extent thereof. Bracket 109 is provided with a vertically extending recess in which is slidably mounted a spring pressed plunger 113 which engages the upper side of the shaft 111 and which functions in conjunction with a pin 114 carried by the bracket and engaging the underside of the shaft to return automatically the bracket 109 and the lever 108 when released from their outwardly swung position, i. e., the dash line position of Fig. 20, back to their normal or full line position. The recess in the bracket 109 engages with flat portions of the shaft 111, wherefore said bracket 109 and the lever 108 can be rocked about the axis of the shaft 111 into any one of four different positions.

The bracket 109 above the recess 110 is provided with a flat segmental shaped surface adjacent the panel 107 and said surface contacts a switch rod 115 which is slidably supported by the panel 107 and has at its inner or right hand end, as viewed in Fig. 20 a recessed portion housing a coil spring 116 which abuts against a reversing switch LS1 and functions to urge the switch rod 115 toward the left but said rod is normally held against the action of the spring 116 by the bracket 109. The switch button 117 of the reversing switch LS1 contacts the bottom of the recessed right hand end of the switch rod 115 and said rod normally maintains said button depressed for forward actuation of the motor 40. However, when the operator rocks the lever 108 and the bracket 109 from the full line position of Fig. 20 into the dash line position thereof the rod 115 moves toward the left under the action of the spring 116 and the switch button 117 follows the movement of the rod and the switch LS1 is actuated for reverse operation of the motor 40. As soon as the operator releases the lever 108 the spring pressed plunger 113 overcomes the spring 116 and will restore said lever, the bracket 109, and the rod 115 to the position shown in full lines in Fig. 20, at which time the button 117 of the switch LS1 is again depressed and said switch is set for forward actuation of the motor.

The switch shaft as previously stated is rockably supported in the panel 107 and it will be noted by reference to Fig. 20 that the rear end of said shaft is rockably supported in a plate 118 carried by a plurality of parallel rods 119 secured in and projecting rearwardly from the panel 107. The switch shaft 111 is provided with a plurality of axially spaced shoulders 120, 121, 122, 123 and 124. Two actuating pins 125 and 126 extend between the shoulders 120 and 121 and said pins are parallel to the shaft 111 but radially spaced therefrom, with the pin 126 angularly spaced from the pin 125, see Fig. 21. An actuating pin 127 extends between the shoulders 121 and 122 and said pin is located in a manner corresponding to the location of the pin 125, see Fig. 22. An actuating pin 128 extends between the shoulders 122 and 123 and said pin is similar to the pins previously referred to except that it is located in a different position circumferentially of the shaft and shoulders as indicated in Fig. 23. An actuating pin 129 extends between the shoulders 123 and 124 and said pin 129 is similar to the previously described pins and is located circumferentially of the shaft 90° from the pins 125 and 127, see Figs. 21, 22 and 24.

Four of the rods 119 are grouped in pairs above and to the left of the shaft 111, as viewed in Fig. 21, and these rods support cooperating switch contacts 130, 131 located so as to extend past the shaft 111 and between the shoulders 120, 121, 122, 123 and 124 and the switches formed by the contacts 130 and 131 are hereinafter designated as switches MS1, MS2, MS3 and MS4, see Fig. 20. Each of the contacts 130 and 131 has a clip portion 132 which embraces the rods 119 and holds the contact in proper position thereon.

It will also be understood that the contacts 130 and 131 are suitably insulated from the rods 119 and at their upper ends are provided with contact screws 113, whereby electrical conduits can be connected to the contacts. Each contact 131 is provided intermediate its end with an offset portion 134 arranged to be engaged by its respective actuating pin to close the contacts 130 and 131, it being understood that when said portion is not engaged by its respective actuating pin the resilience of the contacts maintain the same normally separated.

When the lever 108 is positioned at "high" see Fig. 19, the actuating pin 125 is in contact with the portion 134 of the switch contact 131 of the switch MS1 and the contacts 130 and 131 of said switch are closed. At this time the pin 126, as indicated in Fig. 21, is not in engagement with the portion 134 of the contact arm 131. Also at this time the actuating pin 127 is in engagement with the portion 134 of the contact arm 131 of the switch MS2 but the pins 128 and 129 are out of engagement with the portions 134 of the contact arms 131 of the switches MS3 and MS4. Consequently in the "high" position of the lever 108 the switches MS1 and MS2 are closed for a purpose later to be explained.

When the lever 108 is moved from the full line position of Fig. 19 to the dash line "low" position the shaft 111 is rocked and brings the pin 126 in engagement with the portion 134 of the contact arm 131 of the switch MS1 and keeps said switch closed. This rocking movement of the shaft 111 causes the actuating pin 125 to ride out of contact with the portion 134 of the contact arm 131 of the switch MS1 and also causes the actuating pin 127 to ride out of contact with the portion 134 of the contact 131 of the switch MS2 and hence this latter switch is now open. Consequently when the lever 108 is set in "low" position the switch MS1 is closed. Also the rocking of the lever from "high" position to "low" position causes the pin 128 to engage the portion 134 of contact 131 of switch MS3 to close said switch. Therefore, in the "low" position both switches MS1 and MS3 are closed. At this time the switch MS2 is open.

When the control lever is moved from "low" position to "neutral" position the pins 126 and 128 of switches MS1 and MS3 ride out of engagement with the portions 134 of the respective contact arms 131 and said switches are now open. Also at this time switches MS2 and MS4 are open. When the control lever 108 is moved from the "neutral" position to the dash line "brake release" position of Fig. 19 the switch MS4 is closed by the engagement of the actuating pin 129 with the portion 134 of the contact arm 131 of said switch but all of the switches MS1, MS2 and MS3 are open.

The foregoing detailed description relating to the control lever 108 may be briefly summarized by the statement that normally the switch LS1 is conditioned for forward actuation of the motor 40, but can be conditioned for reverse actuation thereof by rocking the lever 108 from the full line position of Fig. 20 away from the panel to the dash line position thereof, while the release of said lever by the operator automatically restores it to the full line position and conditions the switch LS1 for forward actuation of the motor. Also the lever 108 can be rocked about the axis of the shaft 111 to any one of four positions to selectively close switches MS1 and MS2 for the "high" position; open the switch MS2 and close the switches MS1 and MS3 for the "low" position; open the switches MS1 and MS3 for the "neutral" position, the switches MS2 and MS4 already being opened; or close the switch MS4 for the "brake release" position of the lever, the other switches now being open.

The panel 107 is provided with a "start" button 135 and a "stop" button 136 for actuating the main control switches later to be referred to, it being understood that said buttons 135 and 136 need only be momentarily depressed as they are automatically returned by spring pressure to their extended or normal positions. The control panel 107 is also provided with rockable switch knobs 137 and 138 for controlling a "set-up" or "run" switch 139 and a "hand" or "auto" switch 139a similar to switch 139 and illustrated in the wiring diagram later to be described. It will be noted by reference to Fig. 19 that the arrows on the knobs 137 and 138 visually indicate the different switch positions for the different settings of the knobs.

The braking mechanism shown in Figs. 14 and 18 for the motor shaft 42 will now be described. The brake mechanism is supported on a suitable bracket within the pedestal 36. Referring to Figs. 14 and 18 it will be seen that the pulley on the motor shaft 42 for the belt 41 is axially extended and can be engaged by the brake arms 140 and 141 provided with suitable brake pads and which arms are pivoted on the supporting bracket at their lower ends and embrace the extended portion of the pulley. The upper ends of the arms 140 and 141 are interconnected by a rod 142 which extends through aligned openings in the arms. The rod 142 carries a coil spring 143 which abuts the arm 140 and an adjustable nut 144 screwed on the rod 142. The rod 142 is provided with a head 145 which engages one side of the arm 141 while the opposite side of said arm is engaged by a collar 146 secured to the rod 142. A collar 147 is mounted on the rod 142 intermediate the collar 146 and the arm 140 while the upwardly projecting arm 148 of a bell crank lever straddles the rod 142 intermediate the collar 147 and the upper end of the arm 140. This bell crank lever is pivoted to the arm 140 and has its long arm 149 projecting through an opening in the brake arm 141, as clearly shown in Fig. 18. The outer or free end of the arm 149 of the bell crank lever is operatively connected to the armature of a solenoid 150.

It will be seen that when the solenoid is not energized the spring 143 normally maintains the brake arms 140 and 141 in braking engagement with the extended portion of the pulley, but that when the solenoid 150 is energized to rock the arm 149 of the bell crank lever downwardly then the arm 148 of said bell crank lever forces the collar 147 and the rod 142 toward the right. This action of the arm 148 of the bell crank lever results in the arm 141 being rocked toward the right about its pivot and at the same time the brake arm 140 which is pivotally connected to the bell crank lever is rocked to the left about its pivot compressing the spring 143 and relieving the braking action of the arms on the extended portion of the pulley. The manner in which the brake mechanism is applied and released will be fully set forth in the description of the wiring diagram which will come hereinafter.

In connection with the control of the brake mechanism it is often desirable to stop the spindle in certain definite positions to facilitate the operator in loading the work piece in the chuck, especially when a two-jaw chuck is employed or when the chuck is held in a side opening fixture. The mechanical portion of the brake control mechanism for stopping the spindle in definite predetermined positions consists of a commutator which will now be described.

A pair of rings 151 of insulating material is mounted on the spindle 39 with the rings in axially spaced relation and these rings are each provided with a segmental radially extended portion 152 for a purpose which will soon become apparent. The rings 151 support a sleeve 153 formed of electrically conductive material and provided with segmental openings into which the segmental extended portions 152 of the rings project with the outer surface of the extended portions flush with the outer surface of the sleeve and forming therewith a continuous cylindrical surface. A pair of spaced contacts 154 are located in spaced relation and engage the outer surface of the sleeve 153 in line with the rings 151. The contacts 154 are held and supported stationary in the headstock and are electrically connected with the wiring circuit as will later be explained. Consequently it will be seen that as the spindle rotates the contacts ride on the outer surface of the sleeve 153 for the major portion of each revolution of the spindle and at such time the sleeve completes the electrical circuit between the contacts. However, during a small portion of each revolution of the spindle the contacts are in engagement with the segmental extended portions 152 of the rings 151 and since said rings are formed of insulating material the engagement of the contacts with the portions 152 interrupts the circuit.

As has been pointed out, the brake mechanism is applied by the spring 143 except when the solenoid 150 is energized, and hence when the commutator just described is functioning after the motor control circuit has been interrupted and after a plugging switch, later to be described, has reduced the coasting rotative speed of the motor the solenoid 150 will be energized during the major portion of each coasting revolution of the motor shaft and the brake correspondingly released, while during the minor portion of each such revolution the solenoid is momentarily de-energized and the brake mechanism applied by the spring 143. In other words, as the motor shaft slowly coasts the brake mechanism will be momentarily applied each time the segmental portions 152 engage the contacts 154 and then released when such engagement ceases. Consequently the coasting of the motor shaft will be quickly terminated, as during the coasting revolutions of the shaft the brake mechanism is momentarily applied and then released until the shaft stops in a definite predetermined position.

Suitable means is operatively associated with the motor 40 for plugging said motor to quickly reduce the speed of the same after the operating circuit to the motor has been interrupted and before the brake becomes effective to stop the coasting rotation of the motor and spindle. Although such plugging means may take various forms the present illustration shows a commercial and well known form of plugging switch 155 operatively associated with the motor. Even though this plugging switch per se forms no part of the present invention it is believed advisable for purposes of clear illustration to describe the switch somewhat in detail.

The operating shaft 156 of the plugging switch is operatively connected to the spindle of the motor 40, see Figs. 14 and 32. A rotor 157 is mounted on the operating shaft 156 and said rotor operates within an aluminum cup 158 which has a slight clearance between it and the rotor and between it and the housing.

The rotor 157 is permanently magnetized and rotates with the armature of the motor 40 and such rotation of the rotor tends to rotate the cup 158 in the same direction as will be well understood in the art. The cup 158 is provided with a centrally located bearing shaft 159 which is rotatably mounted in a bearing boss formed internally of the housing of the plugging switch 155. The cup 158 also has fixed thereto a rod 160 extending in the same direction and parallel to the shaft 159 and said rod passes through a slot 161 formed in an internal wall in the housing. The rod 160 is held in centralized position by means of a pair of levers 162 pivoted at their upper ends to said internal wall of the housing and engaging at their lower ends diametrically opposite sides of the rod 160 (see Fig. 34). Springs 163 of predetermined tension maintain the levers 162 in engagement with the rod and centralize the latter in the opening 161, it being understood that when the tendency of the cup to rotate becomes greater than the tension of the springs 163 then the rod 160 will move in the opening 161 and swing one or the other of the levers 162 about its pivot and against the spring tension. A contact bar 164 is pivoted at its upper end to an internal portion of the housing, while its lower end extends through a slot in the rod 160. The bar 164 intermediate its ends is provided with a contact 165 which normally is located intermediate a pair of spaced fixed contacts 166f and 166r but which when the bar 164 is swung by the movement of the rod 160 will engage with one or the other of said fixed contacts depending on the direction of rotation of the rotor. A solenoid 167 is located in the housing of the plugging switch and has pivoted thereto a latch arm 168 which at its free end is provided with a notched portion 169 that can be engaged by gravity with the rod 160 to hold the latter in central position. When the solenoid 167 is energized the latch arm 168 is lifted from the full line position of Fig. 33 to the dash line position thereof and the latch portion 169 is released from the rod 160, whereupon the latter is free to rock under the tendency of the cup 158 to rotate and it will be understood such rocking movement will cause the contact 165 to engage one or the other of the fixed contacts 166f and 166r, depending upon the direction of rocking movement.

As will be pointed out later in describing the electrical control of the machine the latch portion 169 will be in latching position on the rod 160 so long as the motor 40 is not running. The instant that the motor 40 is energized and commences running the latch 169 will be lifted by the solenoid 167 and the rod 160 will be free to move with the cup 158 against the tension of the springs 163 so as to bring the contact 165 into engagement with one or the other of the fixed contacts 166f or 166r, depending upon the direction of rotation of the motor 40.

It may be well to point out here that the torque tending to rotate the cup 158 is proportional to the speed of the motor 40 and that as soon as the speed of the motor diminishes to the point where the tension of the springs 163 is not overcome the levers 162 restore the rod 160 to its central position and disengage the contact 165 with respect to both fixed contacts 166f and 166r.

The function of the plugging switch will be explained further in describing the wiring diagrams for the electrical control of the machine.

In order to explain the function of the parts heretofore described, and particularly the various switches, the operation of the machine will now be described for both manual and automatic operation and with reference to the wiring diagrams of Figs. 30, 31 and 35. The description of the operation of the machine will first be with reference to the hand or manual operation thereof and then the setup and automatic operation of the machine will be described. When the machine is manually operated all of the buttons in the housing 57 at the tail end of the ram or slide are pulled out and rotated to a position wherein their ridges are out of engagement with the slots and are contacting the bosses on the faces of the cam drums, at which time the cam disks are in inactive position and will not contact the respective switch buttons. In other words, during the manual operation of the machine the switches LS2, LS4 and LS6 are not operated, it being noted, however, that switch LS6 is a normally closed switch while switch LS4 is a double throw switch which is normally in a high speed operative position. The switch LS2 is a normally open switch. In addition, the switch LS3 is not actuated by the stop screws of the stop roll during manual operation.

Referring to Fig. 30, the wires 170, 171 and 172 constitute a multiphase circuit from a source of electrical energy and this circuit includes a main disconnecting switch 173 indicated diagrammatically in Fig. 30. The wires 170, 171 and 172 lead to the three contacts of the forward switch 174. The three wires 170, 171 and 172 also lead to the contacts of a reversing switch 175. After the forward switch 174 is engaged then the circuit is extended by the three primary wires 170, 171 and 172 to the three contacts of a low speed switch 176 from which the primary wires extend to the three terminals 177, 178 and 179 (illustrated in Fig. 30 as the inner terminals) of the motor and the latter is operating in the forward direction at low speed. Assuming that the reverse switch 175 is closed and the forward switch 174 is opened, the low switch remaining closed, then the wires 170 and 171 are reversed through the closing of the reverse switch 175, it being noted that the wire 172 remains the same. With this condition existing the motor 40 will be energized in the reverse direction, it being understood that at this time the wire 170 will be connected to the inner terminal 177 while the wire 171 will be connected to the inner terminal 178.

Assuming that the forward switch 174 is closed, the low switch 176 is opened and the simultaneously operated high speed switches 180 and 181 are closed, then the circuit to the motor by the wires 170, 171 and 172 extends, respectively, to the terminals 182, 183 and 184 (illustrated in Fig. 30 as the outer terminals) of the motor. In addition, the closing of the high speed switches 180 and 181 has connected the inner terminals 178, 177 and 179 in an endless circuit by those portions of the wires 170, 171 and 172 leading from the high speed switch 181 and to the three inner terminals, as will be well understood in the art.

In the high speed operation of the motor 40 when the forward switch 174 is opened and the reverse switch 175 is closed, the wires 170 and 171 to the outer terminals 182 and 183 are reversed, whereupon the motor is energized for high speed operation in the reverse direction.

It will be understood that the forward and reverse switches are the low and high switches just explained and the circuits through said switches to the motor terminals are well known in the art and therefore are only illustrated in the conventional diagrammatic way in Fig. 30.

Referring to Figs. 31 and 35, it is pointed out that the solenoid Fwd. controls the forward switch 174 while the solenoid Rev. controls the reverse switch 175. It will also be understood that the double solenoid High controls the simultaneously acting high speed switches 180 and 181, while the solenoid Low controls the low speed switch 176. It will be well to note at this time that the control circuit contains certain safety interlock normally closed switches between the line 170 of the control circuit and the solenoids Fwd., Rev., High and Low, just referred to.

Normally closed safety switches R and F are located in the circuits for the solenoids Fwd. and Rev., respectively. When solenoid Fwd. is energized switch F is opened and when solenoid Rev. is energized switch R is opened. Therefore, only one of the solenoids Fwd. and Rev. can be energized at a time.

Normally closed safety switches L and H are located in the circuits for the solenoids High and Low, respectively. When solenoid High is energized switch H is opened and when solenoid Low is energized switch L is opened. Therefore, only one of the solenoids High and Low can be energized at a time.

Referring to Figs. 31 and 35 it will be seen that the control for the machine includes a start and stop circuit containing start and stop switches, indicating light and a master switch MS1. The control diagram also includes a forward and reverse circuit containing solenoids Fwd., Rev., CR4 and CR3 which actuate the motor control switches and other switches in the circuit as will later be referred to. In addition there is a threading circuit containing the solenoid CR1 and the indicating light circuit for the light 223. Also the control includes the High-Low circuit which contains the High and Low solenoids for actuating certain motor control switches as well as other switches. Further, the control for the machine includes the positioning circuit which contains the commutator on the spindle and the solenoid CR5. Cooperating with this positioning circuit is the brake circuit which includes the brake solenoid 150, as well as certain switches actuated by the solenoids of certain of the other circuits. A dead spindle circuit contains the solenoid CR2 as well as the limit switches LS6 and LS5 and the holding switch CR2. Finally there is the plugging circuit containing the plugging switch.

In describing the hand operation of the machine a number of assumptions will first be stated before describing the operation in detail. It will be assumed that the slide is in its most rearward position and that the No. 1 face of the turret is located toward the chuck of the work spindle. It will also be assumed that the main control lever 108 is in neutral position, see Fig. 19, and that the switch knobs 137 and 138 on the panel 107 are set, respectively, in the run and hand positions. In addition, the cam disks which control the switches LS2, LS4 and LS6 will be assumed to all be located in the inactive position. Furthermore, the stop screws 58 of the stop roll will be assumed to have been adjusted properly for positively arresting the forward movement of the slide at predetermined positions for each of the operative steps of the work cycle, while the commutator on the work spindle will have been adjusted for stopping and locating said spindle in predetermined position.

The operator now momentarily depresses the start button 135 to close the starting switch in the start and stop circuit and complete the circuit through solenoid UV by means of the wire 185 extending between the wires 170 and 171 and including the stop switch 136 which is normally closed. The starting switch 135 and stop switch 136 are single throw spring-returned switches and the momentary closing of the starting switch energizes the solenoid UV and closes the normally open switch UV in the holding circuit 186 and also closes the normally open switch UV in the wire 187. The wire 185 and holding circuit 186 being energized the primary 188 of a transformer is energized and causes energization of the secondary 189 of said transformer and which secondary is connected to the indicating light 190 on the switch panel. The operator now loads a work piece into the chuck of the work spindle and it will be assumed that then he moves the control lever 108 into the high speed position. When the control lever 108 is in the high speed position the switches MS1 in the start and stop circuit and the switch MS2 in the high-low circuit are closed. The operator by means of the turnstile moves the slide forwardly and during this forward movement the dog carried by the slide momentarily closes switch LS5 to complete the circuit through solenoid CR2 in the dead spindle circuit, it being recalled that switch LS6 is normally closed. The momentary closure of switch LS5 causes energization of solenoid CR2 in wire 191, effects closure of normally open switch CR2 in holding circuit 192 and thereafter during the manual operation of the machine the solenoid CR2 remains energized and consequently any further momentary actuations of switch LS5 in the movements of the slide have no effect on the circuit through the solenoid CR2 as now established. The energization of the solenoid CR2 also closes the normally open switch CR2 in the wire 193 of the forward and reverse circuit. Now the spindle commences to rotate in the forward direction and at high speed.

It will be seen that the forward and reverse circuit for the control of the motor now includes the wires 194 and 195, the switch 139, wire 193, switch CR2, wires 198 and 199, double throw switches LS1, CR1, solenoid Fwd. and normally closed switch R. Also in the forward and reverse circuit the solenoid CR4 in wire 200 is now energized. The energization of the solenoid Fwd. closes the forward motor switch 174 and opens the normally closed switch F in wire 206 which prevents energization of the solenoid Rev. The energization of solenoid CR4 closes normally open switch CR4 in wire 201 of the plugging circuit, normally open switch CR4 in wire 202 of the brake circuit and opens normally closed switch CR4 in wire 203 of the positioning circuit.

The high and low circuit is now completed through the wire 194, wire 197, switch 139a, wire 196, switch MS2, wire 204, double solenoids high and normally closed switch L. The energization of the double solenoids "high" closes the high motor control switches 180 and 181 and also opens normally closed switch H in wire 205 which prevents energization of solenoid "low."

It will be understood that when the normally open switch CR4 in wire 202 of the brake circuit was closed then the circuit through brake solenoid 150 was completed through the wire 202 and the brake released.

It will also be understood that when the normally open switch CR4 in wire 201 of the plugging circuit was closed the circuit through plugging switch solenoid 167 was completed and said solenoid released the latch 168 of the plugging switch and said switch became free to function in the manner previously described.

The operator continues the forward movement of the slide by the manual rotation of the turnstile until such movement is positively arrested by the engagement of a stop screw with the positive stop lug, after which he revolves the turnstile to move the slide rearwardly to clear the tool from the workpiece and then indexes the turret to bring No. 2 face into operative position.

Assuming that the second step of the operative cycle requires low speed operation of the spindle in the forward direction, the operator moves the control lever 108 from the high position to the low position wherein switch MS1 in the start and stop circuit and switch MS3 in the high and low circuit are closed, it being understood that switch MS2 is now open. Consequently the spindle will now be rotating in the forward direction and at low speed, it being understood that no changes take place in the forward and reverse circuit from the condition of that circuit as explained relative to the first operative step. The high and low circuit now is completed through solenoid "low" by the wire 196 extending from switch 139a, the wire 210 which includes switch MS3, the wire 205 and the normally closed switch H.

It will be understood that the instant switch MS2 opened and the double high solenoid in wire 204 was deenergized switched H closed and also that the instant solenoid "low" became energized switch L in wire 204 opened, thus preventing energization of the high solenoids. The energization of the low solenoid closed low motor control switch 176, while the deenerigization of the high solenoids opened high motor control switches 180 and 181.

Assuming that the second operative step is a threading operation, the operator manually moves the slide forward with the spindle rotating at low speed in the forward direction until the threading die engages the work piece, at which time he grasps the control lever 108 preparatory to reversing the spindle operation. As soon as the threading die has threaded the work piece the desired distance the operator pulls the control lever outwardly and away from the panel to actuate the double throw switch LS1 in the forward and reverse circuit to open the contacts of said switch in the wire 199 of the forward circuit and close the contacts of said switch in the wire 206 of the reverse circuit. Consequently the circuit through solenoid Fwd. is interrupted and therefore forward motor control switch 174 is opened. The deenergization of the solenoid Fwd. allows normally closed switch F to close and therefore the circuit is completed through solenoid Rev. which closes reverse motor switch 175 and opens the switch R, preventing energization of solenoid Fwd. The deenergization of solenoid Fwd. also deenergizes solenoid CR4 which opened switches CR4 in wire 201 of the plugging circuit and wire 202 of the brake circuit and allowed normally closed switch CR4 in wire 203 of the positioning circuit to close. However, simultaneously with the deenergization of solenoid CR4, solenoid CR3 in wire 207 of the forward and reverse circuit was energized, wherefore normally open switches CR3 in wire 208 of the plugging circuit and in wire 209 of the brake circuit closed while normally closed switch CR3 in wire 203 of the positioning circuit opened. Therefore, the brake remains released, the positioning commutator continues to be inactive, while the plugging switch is conditioned to function when the occasion occurs. The operator continues the rearward movement of the slide by means of the turnstile to assist the die in running off of the work and when the die is clear of the work ne will release the control lever 108 which will automatically actuate the double throw switch LS1 to restore forward actuation of the motor.

Assuming that the slide has been moved sufficiently far to the rear to permit the indexing of the turret, the operator will perform this function and position No. 3 face of the turret in operative relationship to the chuck of the work spindle. The operative steps so far described have included forward high speed operation of the spindle, forward low speed operation thereof and also reverse low speed operation. The manner in which the spindle may be operated in the reverse direction at high speed will be obvious from the description already set forth in connection with the diagrams of Figs. 30, 31 and 35. Therefore we may assume that the operator has operated the machine through all of the six steps of a complete work cycle to the point where the slide has been moved rearwardly at the end of the sixth step and it is desired to unload the finished work piece and load a new work piece in the chuck.

At this time the operator moves the control lever 108 into neutral position wherein switch MS1 in the start and stop circuit is open and also both switches MS2 and MS3 in the high and low circuit are open. Therefore the forward and reverse circuit is interrupted as is also the high and low circuit. The motor when its control circuits are thus interrupted will continue to coast in the forward direction, assuming that this was the last direction of operation of the motor. At this time the plugging switch becomes effective to slow down the coasting rotation of the motor.

As already explained, the previous operation of the motor conditioned the plugging switch for functioning when the occasion occurred. Therefore, the movable contact 165 of said switch has been in engagement with the fixed contact 166F during the forward rotation of the motor. Consequently the solenoid CR3 has been energized through the plugging switch and the normally open switches CR3 in the plugging circuit and the braking circuit have continued closed while the normally closed switch CR3 in the positioning circuit has continued open. However, during the forward operation of the motor no current could flow by way of the plugging switch through the Rev. solenoid, inasmuch as switch F has been held open by solenoid Fwd. The instant that switch MS1 opened solenoid Fwd. was deenergized and switch F closed, whereupon current can flow through the wire 224, the plugging switch, wires 226 and 207 to energize solenoid Rev. and close motor reverse switch 175 and impart reverse current to the motor while it is coasting in the forward direction and thus slow down such coasting rotation until the spring-tensioned arms of the plugging switch move the contact 165 thereof out of engagement with the fixed contact 166F to interrupt the circuit to the solenoids Rev. and CR3. The deenergization of solenoid CR3 opens switch CR3 in wire 208 of the plugging circuit and thus interrupts the circuit to and deenergizes solenoid 167 of the plugging switch. The deenergization of solenoid 167 allows the latch of the plugging switch to drop by gravity and hold the movable contact 165 out of engagement with either of the fixed contacts 166F or 166R, wherefore both wires 226 and 225 are dead. The deenergization of solenoid CR3 allows normally closed switch CR3 in wire 203 of the positioning circuit to close, whereupon solenoid CR5 in said circuit is energized whenever current is flowing through the positioning commutator. The energization of solenoid CR5 closes switch CR5 in wire 215 of the brake circuit and causes the brake solenoid 150 to be energized and the brake held released even though the deenergization of CR3 solenoid has caused the switch CR3 in wire 209 of the brake circuit to open. Therefore the spindle will be free to rotate at the slow coasting speed to which it has been reduced by the action of the plugging switch, except that each time the portions 152 of the insulating rings of the commutator engage the contacts 154 the positioning circuit is interrupted and the solenoid CR5 deenergized, whereupon switch CR5 in the brake circuit opens, deenergizing solenoid 150 and applying the brake. This application of the brake is momentary so long as the spindle is coasting as the extended portions 152 of the insulating rings of the commutator will move out of engagement with the contacts 154 and the latter will engage the sleeve 153 of the commutator and current will be established through the positioning circuit and the solenoid CR5 again energized to close the switch CR5 in the brake circuit and release the brake. In other words, the positioning commutator will function during each remaining revolution of the spindle to alternately apply and release the brake and then stop the spindle in a predetermined position. The slowing down of the motor and spindle by the plugging switch will allow the motor and spindle to be brought to a rest in the predetermined position by the positioning commutator after one or two revolutions of the spindle, depending upon the adjustment of the plugging switch.

The operator can now unload the finished work piece and reload a new work piece in the chuck and repeat the cycle of operation already explained. In case it is not desired to locate the spindle by the positioning commutator and to have the spindle free to be rotated by hand, the operator can move the control lever 108 from the neutral position into brake release position to close switch MS4 in wire 211, 212 of the brake circuit and maintain the solenoid 150 energized and the brake released to allow him to freely rotate the spindle by hand.

*Set-up of machine for automatic control of motor circuits*

When the machine is to be set up for automatic control of the motor circuits the control lever 108 is positioned and left in either the high or low position so that the switch MS1 in the start and stop circuit remains closed.

The operator turns the switch knob 137 on the panel 107 to set-up position, whereupon the forward and reverse circuit to the motor 40 becomes dead. When this is done a circuit is established from wire 195 through wire 214 to wire 203, normally closed switches CR4 and CR3 and the solenoid CR5 of the positioning circuit. The energization of the solenoid CR5 closes normally open switch CR5 in wire 215 of the brake circuit and the latter is completed to energize the solenoid 150 and release the brake mechanism whereupon the spindle can be freely rotated by hand.

The operator at this time may also turn the switch knob 138 on the panel 107 into the auto position, whereupon wire 197 is connected by wire 216 to wires 204 and 205 of the high and low circuit which includes the double throw switch LS4 and normally closed switches L and H, and also the "high" and "low" solenoids.

The operator now adjusts the cam disks in the housing 57 to obtain the automatic control for the high and low circuit through the switch LS4 and for the forward and reverse circuit through the switch LS2 in the threading circuit, as well as to cause the switch LS3 also in the threading circuit to become active during the operation of the machine. The cam disks for controlling the switch LS6 in the dead spindle circuit are also adjusted.

In order to obtain automatic control for the high and low speed operation of the motor, the cam disks carried by the drum 91 and which actuate the switch button 84 of the two-position switch LS4 are adjusted in accordance with the motor operation desired for each step of the work cycle, that is, with respect to the tools carried by each face of the indexible turret. As previously pointed out, the cam disks 95 carried by the drum 91 (see Fig. 26) correspond in number to the faces of the turret and each button 97 associated with a cam disk 95 is numbered to correspond to a particular turret face. It will be recalled that the drum 91 is operatively connected to the indexible turret and indexes therewith. If high speed operation of the motor is desired for particular steps in the work cycle, i. e., different turret faces, the buttons bearing the numbers corresponding to such steps or turret faces are pulled outwardly and rotated to a position wherein the particular cam disk 95 is inactive and does not contact the switch button 84. The buttons 97 corresponding to the turret faces for which low speed operation of the motor is desired are rotated to bring the ridges 98 into alignment with groove 99 so that the cam disks 95 associated with said buttons will be extended to an active position to contact the switch button 85, and actuate the switch LS4 from high speed position to low speed position.

In Fig. 26 starting at the left hand side of the view, it will be seen that for turret faces No. 1, No. 3, No. 4 and No. 6 there will be high speed operation of the motor, while for turret faces No. 2 and No. 5 there will be low speed operation of the motor.

The cam disks 95 carried by the drum 90 and which control the switch LS2 can be adjusted to obtain automatic reversal of the spindle rotation for threading operations. The cam disks 95 in the drum 90 are retracted and held in inactive position for those faces of the turret wherein automatic reversal of the spindle rotation is not desired. For such faces of the turret at which threading operations are performed the cam disks of the drum 90 are extended to active position to actuate switch LS2.

Referring to Figs. 31 and 35, it will be seen that the normally open switch LS2 is located in wire 213 and that the closing of said switch does not complete the circuit through wire 213 until the switch LS3 is momentarily closed, whereupon the solenoid CR1 in the threading circuit is energized and the switch CR1 is closed thereby to complete the holding circuit 217, whereby the solenoid CR1 is maintained energized during the operative step to control the double throw switch CR1 in the forward and reverse circuit. The manner in which the stop screws of the stop roll are adjusted for actuating the switch LS3 will be dedescribed later.

The energization of solenoid CR1 also closes normally open switch CR1 in wire 218 thus energizing the primary 219 of a transformer, the secondary 220 of which is in a circuit composed of the wires 221 and 222 which extend to an indicator light 223 located on the panel 107.

The cam disks 95 and 101 carried by the drum 92 control the normally closed switch LS6 in the dead spindle circuit to obtain the stopping and starting of the spindle. The adjustment of these cam disks on the drum 92 can produce any of the following arrangements. The spindle can be made to run continuously when indexing from one turret face to the next turret face or the spindle can be made to stop during turret indexing when the turret slide is in its rearmost position and then start again as the turret slide commences to advance. In addition, the spindle can be caused to stop during turret indexing when the turret slide reaches the rearmost position and remain stopped when the turret slide again advances.

As illustrated in Fig. 25 and starting at the left a cam disk 101 is provided, in this instance, for turret faces 1, 3 and 5 while a cam disk 95 is provided for turret faces 2, 4 and 6. In setting the cam disks for automatic starting and stopping of the spindle controlled by the movement of the slide, the cam disk 101 for the first turret face is positioned by its button 103 to contact and hold the switch button 85 of the normally closed switch LS6 in the dead spindle circuit depressed and said switch open, thus deenergizing solenoid CR2, breaking the holding circuit 192 and also opening switch CR2 in wire 193, thus rendering dead the forward and reverse circuit to the motor. The switch LS6 is held open by the cam disk 101 during the entire time that turret face No. 1 is presented toward the work spindle.

When the turret is indexed to bring No. 2 face in line with the work spindle then the cam disk 101 is disengaged from the switch button 85 as the drum 92 indexes with the turret, whereupon normally closed switch LS6 closes. The cam disk of the drum 92 corresponding to the second turret face is positioned in retracted or inactive location wherein it has no effect on the switch button 85. When the slide is moved forwardly and the second turret face is facing the spindle the dog on the slide momentarily closes switch LS5 in the dead spindle circuit completing the circuit through and energizing solenoid CR2 and said solenoid thereupon closes switch CR2 in holding circuit 192 to establish said circuit. The energization of solenoid CR2 also closes switch CR2 in wire 193 to reestablish the forward and reverse circuit for the motor, with the result that the spindle then commences to rotate. When the turret is indexed to bring the third face thereof in line with the work spindle the drum 92 is correspondingly indexed to bring the cam disk 101 for the third face of the turret into operative relationship to the switch button 85.

Referring to Fig. 25 it will be noted that said cam disk 101 has been located in extended position by its button 103 so that as the drum 92 indexes said cam disk will momentarily depress the switch button 85 thus momentarily opening the switch LS6 in the dead spindle circuit deenergizing solenoid CR2, opening switch CR2 in the holding circuit 192 and switch CR2 in the wire 193 of the forward and reverse circuit thereby stopping the rotation of the motor and the work spindle. At this time it will be understood the slide is in its most rearward position and as the slide moves from this position forwardly for the third operative step of the work cycle the dog on the slide will momentarily close switch LS5, thus energizing solenoid CR2, closing switch CR2 in the holding circuit 192 and switch CR2 in wire 193 and reestablishing the forward and reverse circuit in the motor control, whereupon the motor and spindle will again commence to rotate.

The cam disk 95 for the fourth operative step is in extended switch actuating position, as shown in Fig. 25, wherefore when the slide reaches its most rearward position at the end of the third operative step and the turret is indexed to bring the fourth face thereof into line with the spindle the drum 92 is correspondingly indexed and said cam disk 95 momentarily depresses switch button 85 similarly to the last mentioned cam disk 101 and opens switch LS6.

The cam disk 101 for the fifth operative step and the cam disk 95 for the sixth operative step are held in retracted position wherein they have no effect on switch button 85 as the drum 92 is indexed synchronously with the indexing of the turret. Therefore the spindle will continue to rotate after the completion of the fourth step and when the slide has reached its most rearward position and the turret indexes preparatory to initiating the fifth and sixth steps, it being understood that the forward movement of the slide in said steps momentarily closes switch LS5 but this has no effect since the holding circuit 192 remains effective.

It will be understood that the particular arrangement of the cam disks carried by the drums 90, 91 and 92 as explained herein can be varied to suit particular conditions and that the explanation of the particular arrangements illustrated is merely by way of example.

The manner in which the stop screws 58 will be adjusted for automatic reversal of the spindle rotation at the end of threading operations will now be explained. Assuming that the operator has turned the thumb lever 77 on the switch box 68 to "early" he then moves the slide toward the spindle by means of the turnstile 47. The movement of the slide toward the spindle is stopped so that the chasers of the thread cutting die will be about one inch from the end of the threading operation. The operator now screws in the proper stop screw 58 until said screw engages the movable abutment member 59 and moves the same sufficiently far to effect a closure of the switch LS3 located in wire 213 of the threading circuit, it being understood that switch LS2 is now closed due to the adjustment given to the cam disk of the drum 90 as previously described. Consequently when the switch LS3 closes the circuit is completed through wire 213 and solenoid CR1 with the result that switch CR1 in wire 217 closes and completes the holding circuit. The energization of solenoid CR1 also closes switch CR1 in wire 218 thus completing the circuit through said wire and through the primary 219 of a transformer. Therefore the secondary 220 of the transformer is excited and the light 223 connected to said secondary by the wires 222 and 221 lights up. In other words, in adjusting the stop screw 58 the operator continues to turn said screw until the indicating light 223 on the panel 107 lights up showing that switch LS3 is closed. After this he moves the slide to its extreme rearward position preparatory to determining by actual operation of the machine if the stop screw is properly adjusted. If the operator finds by actual operation that certain fine adjustments are necessary for the stop screw he can make the same as occasion demands as will be well understood. Should a collapsible die or tap be used for the threading operation the stop screw 58 can be adjusted in the same way, only the operator in such instance will turn the thumb lever 77 to "late" so that there will be only a slight movement of the slide between the closing of the switch LS3 and the releasing of the collapsible die or tap.

It will be understood that only certain stop screws will be adjusted as just explained in accordance with the operative steps that include threading operations and also in accordance with the adjustment of the cam disks that control the switch LS2.

In order to clarify and coordinate the description heretofore given a résumé of the operation of the machine during the automatic control thereof will now be explained. It will be assumed that the cam disks in the drums 91 and 92 are adjusted as shown in Figs. 26 and 25 and that the cam disks in the drum 90 are adjusted to correspond with the adjustment of the cam disks in the drum 91. It will also be assumed that the stop screws 58 and thumb lever 77 for threading operations have been properly adjusted and that the commutator on the spindle has been located to cause the spindle to come to rest in a predetermined position. In addition it will be assumed that a loading fixture is mounted on the first face of the turret and that therefore dead spindle is desired in order to move the slide toward the spindle and bring the latter into position to properly load the work piece in the chuck of the spindle. The machine having been properly set up the control knob 137 is set in run position and the control knob 138 is set in auto position, while the control lever 108 is set in either the high or low position to cause switch MS1 to be closed. The operator need not pay further attention to the control lever after so setting it and it remains in the said position throughout the automatic operation of the machine.

The operator now momentarily depresses the starting button 135, completing the start and stop circuit and the indicating light 190 lights up. We will assume that the slide is in its rearward position and that No. 1 face of the turret is presented to the chuck and at this time the spindle will not be rotating as switch LS6 is held open. The operator by means of the turnstile now moves the slide forwardly to bring the loading fixture and the work on the first face of the turret into loading position with respect to the chuck. During this forward movement of the slide switch LS5 is momentarily closed but no circuit is established thereby since switch LS6 is open. Also at this time the cam disks 95 of the drums 90 and 91 are in the retracted or inactive position and therefore normally open switch LS2 remains open while double contact switch LS4 remains in high position.

The operator after the work piece is clamped in the chuck moves the slide to its most rearward position and indexes the turret to bring No. 2 face thereof into line with the work spindle. The indexing of the turret indexes drums 90, 91 and 92, and causes switches LS6 and LS2 to close while double contact switch LS4 is moved from high to low position. The operator now moves the slide forwardly and the dog on the slide momentarily closes switch LS5, thus completing the circuit through solenoid CR2 of the dead spindle circuit which establishes the holding circuit 192 and closes switch CR2 in wire 193 of the forward and reverse circuit and the motor and spindle now commence to rotate in the forward direction and at low speed. The energization of the solenoid CR4 in the forward and reverse circuit closes switch CR4 in the brake circuit and the brake is released. The energization of solenoid CR4 also closes switch CR4 in the plugging circuit to lift the latch 168 to inactive position and open switch CR4 in the positioning circuit. The movable contact 165 of the plugging switch moves into engagement with the fixed contact 166F thereby energizing solenoid CR3 and closing switches CR3 in the plugging circuit and the brake circuit and opening switch CR3 in the positioning circuit. The energization of the Fwd. solenoid opens switch F and closes forward motor control switch 174.

The operator moves the slide forwardly and a threading operation is being performed on the work piece. However, since the forward movement of the slide brings the stop screw 58 into contact with the movable abutment member 59 switch LS3 is closed and completes the circuit to solenoid CR1, it being recalled that normally open switch LS2 is already closed. The energization of solenoid CR1 establishes the holding circuit 217, opens switch CR1 in wire 199 to interrupt the forward circuit to the motor and closes switch CR1 in wire 193 to establish the reverse circuit to the motor and energize solenoid Rev. which opens switch R in wire 199, it being understood that the deenergization of solenoid Fwd. closed switch F in wire 193 and caused contact 165 of the plugging switch to engage contact 166R. The energization of the solenoid Rev. closed reverse motor switch 175, while the deenergization of solenoid Fwd. opened the forward motor switch 174. The motor is now operating in the reverse direction with the brake released. The spindle is now rotating in the reverse direction and the operator revolves the turnstile to move the slide rearwardly and back off from the work the threading tap or die. The rearward movement of the slide is continued to its rearward position, whereupon the operator indexes the turret from No. 2 position to No. 3 position and correspondingly effects an indexing rotation of the drums 90, 91 and 92.

The indexing of the drum 90 to No. 3 position causes switch LS2 in the threading circuit to open, thus breaking the circuit to solenoid CR1 and interrupting holding circuit 217. The deenergization of solenoid CR1 causes the double contact switch CR1 in wires 199 and 193 of the forward and reverse circuit to change from reverse to forward position for forward operation of the motor. The indexing of drum 91 from second to third position causes the double contact switch LS4 in the high and low circuit to change from low position to high position for high speed operation of the motor. The indexing movement of drum 92 from No. 2 position into No. 3 position momentarily opens switch LS6 in the dead spindle circuit, interrupting the circuit to solenoid CR2 and deenergizing the latter to interrupt holding circuit 192 and to open switch CR2 in wire 193 of the forward and reverse circuit, thus deenergizing the motor. The motor will continue to coast in the reverse direction but it will be recalled that movable contact 165 of the plugging switch is in engagement with fixed contact 166R and therefore solenoid Fwd. will be energized, it being understood that switch R closed upon the deenergization of solenoid Rev., and consequently forward switch 174 of the motor circuit will be closed and a forward energization given to the motor to slow the reverse coasting movement thereof. As soon as the coasting movement has been reduced in speed to a predetermined point the spring-tensioned arms 162 of the plugging switch move the movable contact 165 thereof out of engagement with the fixed contacts and breaks the circuit to solenoid Fwd. At this time both solenoids CR3 and CR4 are deenergized, thus opening switches CR3 and CR4 in wires 208 and 201 of the plugging circuit and deenergizing plugging switch solenoid 167 to allow the latch member 168 to hold the rod 160 and movable contact 165 in neutral position. At the same time the switches CR3 and CR4 in wires 209 and 202 of the brake circuit are opened.

The slide is now in its most rearward position, the turret has been indexed from No. 2 face to No. 3 face, the switches LS2 and LS4 have been opened to condition the motor controlling circuits for high forward operation of the motor and the switch LS6 was momentarily opened as just described above. The operator now moves the slide forwardly by the turnstile for the third step in the cycle. The forward movement of the slide momentarily closes switch LS5 whereupon the spindle commences to rotate in the forward direction and at high speed and the brake is released. Also at this time the latch 168 of the plugging switch is lifted whereupon the movable contact 165 moves into engagement with the fixed contact 166F, it being recalled that switch F is now open. It will also be noted that the engagement of movable contact 165 with fixed contact 166F energizes solenoid CR3, whereupon switches CR3 in the brake circuit and plugging switch circuit close and switch CR3 in positioning circuit opens.

The operator continues the forward movement of the slide until the stop screw 58 engages the movable abutment member 59 and moves the latter into engagement with the positive stop lug 61 and the forward movement of the slide is arrested. Although the shifting of the movable abutment member, as just explained, causes the switch LS3 to close, it will be recalled that switch LS2 is open and consequently no energization of solenoid CR1 in the threading circuit takes place and the motor continues to rotate in the forward direction and at high speed. The operator now manually moves the slide to its most rearward position and indexes the turret from No. 3 face to No. 4 face with a resultant corresponding indexing movement to the drums 90, 91 and 92. Inasmuch as the cam disks of said drums are adjusted in the identical manner, as was the case for the third step, the actuation of the switches and the conditioning of the circuits will be the same and need not be repeated herein.

The operator then moves the slide forwardly for the fourth step of the cycle and then rearwardly at the end of the fourth step and indexes the turret and the drums 90, 91 and 92 as well as the stop roll from the fourth position to the fifth position. The cam disks corresponding to the fifth step are already adjusted in the drums in the same way as were the cam disks for the second operative step and therefore the manner in which the switches are operated and the circuits completed or conditioned for the fifth step need not be set forth in detail. The operator moves the slide forwardly for the fifth step and then rearwardly at the end of said step, indexes the turret, the cam disk drums and the stop roll. The cam disks 95 of the drums 90 and 91 for the sixth step in the cycle are set identically with the cam disks of said drum for the first step. The cam disk 95 corresponding to the sixth step and carried by the drum 92 is positioned in inactive location, wherein it will have no effect on the switch LS6, and consequently the motor 40 will continue to run in the forward direction and at high speed. The operator now moves the slide forwardly for the sixth step and then when the forward movement has been terminated he moves the slide to its most rearward position, indexes the turret, the drums 90, 91 and 92 and the stop roll from the No. 6 position to No. 1 position, whereupon the cam disk 101 of the drums 92 and corresponding to the first step of the cycle opens the switch LS6 and holds the same in that condition thus interrupting the dead spindle circuit to solenoid CR2, and deenergizing the latter and causing switch CR2 in wire 193 of the forward and reverse circuit to open. It will also be understood that the plugging switch, the brake and the positioning commutator will function at this time in the manner previously explained herein. The spindle is now stopped in predetermined position and the operator can unload the finished work piece from the chuck and mount a new work piece in the loading fixture on No. 1 face of the turret.

It will be understood that if the cam disk 101 carried by the drum 92 for the first step is not adjusted for either dead spindle or for stopping the spindle, the operator at the end of the complete work cycle could stop the spindle by momentarily depressing the stop button 136. Alternatively, to momentarily depressing the stop buttons 136 the operator could move the control lever 108 from either the high or low position in which it has been into neutral position and thus open switch MS1 and interrupt the motor control circuits. In some instances it may be necessary in loading a new work piece to revolve the spindle by hand and in those cases the operator would shift the control lever 108 into the brake release position which would effect the release of the brake mechanism in the manner already explained herein and would free the spindle for manual rotation.

In the release of the brake as just referred to it will be recalled that the latch 168 of the plugging switch is in engagement with the rod 160 and consequently all danger of the motor being energized through the plugging switch is eliminated.

From the foregoing description it will have been seen that a machine tool embodying the invention will have its operations so controlled, either manually or automatically, that the machine can function in an improved, rapid and efficient manner in the economic production of work pieces. The improved control of the machine which is responsible for it functioning in such rapid and efficient manner includes the novel arrangement for controlling the speeds, direction of movement and the starting and stopping of the spindle at the proper times in the work cycle and which control is actuated in part by the indexing of the turret and in part by the movements of the slide. The improved control can be present to obtain different operating conditions for all the different operative steps of the work cycle within the capacity of the machine and then the control functions automatically in the manner desired and at the proper times without requiring the attention of the operator.

The control of the motor and spindle also includes improved means for rapidly slowing down the rotation of the motor when coasting and then braking the motor to a stop or bringing the spindle to rest in a predetermined position to facilitate loading and unloading of the work piece.

Although a preferred embodiment of the invention has been illustrated and described herein it will be understood that the invention is susceptible of various modifications and adaptations within the scope of the appended claims.

Having thus described my invention, I claim:

1. In a machine tool, a support, a rotatable spindle and a slide having feeding and idle movements relative thereto and both carried by said support, an indexible member carried by said slide, said spindle and said member being adapted to carry work and tools, a power drive for rotating said spindle in opposite directions, and an electrical control for said drive including a control circuit, a support carried direction control switch in said circuit for effecting change in direction of rotation of said spindle, cooperating means on said slide and support for actuating said switch at a predetermined point in the feeding movement of the slide, a slide carried direction control switch in said circuit in series with said support carried direction control switch, an indexible element having means to actuate said slide carried direction control switch in correlation to the different operative steps of the work cycle, and mechanical operative connections between said indexible member and said indexible element for indexing said element in correlation to the indexing movement of said member.

2. In a machine tool, a support, a rotatable spindle and a slide having feeding and idle movements relative thereto and both carried by said support, an indexible member carried by said slide, said spindle and said member being adapted to carry work and tools, a power drive for rotating said spindle in opposite directions, and an electrical control for said drive including a control circuit, a support carried direction control switch in said circuit for effecting change in direction of rotation of said spindle, cooperating means on said slide and support for actuating said switch at a predetermined point in the feeding movement of the slide, a slide carried direction control switch in said circuit in series with said support carried direction control switch, an actuating means for said slide carried direction control switch and including an indexible element provided with a plurality of switch actuating members corresponding in number to the operative steps of the work cycle and presettable to either an active or an inactive position, and mechanical operative connections between said indexible member and said indexible element for indexing said element in correlation to the indexing movement of said member.

3. In a machine tool, a support, a rotatable spindle and a slide both carried by said support, an indexible member carried by said slide, said spindle and said member being adapted to carry work and tools, an indexible stop roll carried by said slide and provided with adjustable stop screws corresponding in number to the operative steps in a work cycle, operative connections between said member and stop roll for indexing the latter upon the indexing of said member, a power drive for rotating said spindle in opposite directions, a control for said drive including an electrical control circuit, a support carried direction control switch in said circuit for effecting change in direction of rotation of said spindle, means carried by said support and cooperating with said stop screws for actuating said switch at predetermined points in the movement of the slide for the different operative steps of the work cycle, a slide carried direction control switch in said circuit in series with said support carried direction control switch, an indexible element having means to actuate said slide carried direction control switch in correlation to the different operative steps of the work cycle, and mechanical operative connections between said stop roll and said indexible element for indexing said element in correlation to the indexing movement of said stop roll and said member.

4. In a machine tool, a support, a rotatable spindle and a slide both carried by said support, an indexible member carried by said slide, said spindle and said member being adapted to carry work and tools, an indexible stop roll carried by said slide and provided with adjustable stop screws corresponding in number to the operative steps in a work cycle, operative connections between said member and said stop roll for indexing the latter during the indexing of said member, a power drive for rotating said spindle in opposite directions, and a control for said drive including an electrical control circuit, a support carried direction control switch in said circuit for effecting change in direction of rotation of said spindle, mounting means for said support carried direction control switch and adjustably connected with said support, means carried by said support and cooperating with said stop screws for actuating said switch, manually operated presettable means located on said support and cooperating with said mounting means for adjusting the latter to selectively vary the predetermined point in the movement of the slide at which said switch is actuated by said stop screws, a slide carried direction control switch in said circuit in series with said support carried direction control switch, an indexible element having means for actuating said slide carried direction control switch selectively in correlation to the different operative steps of the work cycle, and mechanical operative connections between said indexible stop roll and said indexible element for indexing said element in correlation to the indexing movement of said stop roll and said member.

5. In a machine tool, a support, a rotatable spindle and a slide both carried by said support, an indexible member carried by said slide, said spindle and said member being adapted to carry work and tools, a multispeed power drive for rotating said spindle at different speeds in opposite directions, and an electrical control for said drive including a control circuit, a support carried direction control switch in said circuit for effecting change in direction of rotation of said spindle, cooperating means on said slide and support for actuating said switch at a predetermined point in the movement of the slide, a slide carried direction control switch in said circuit in series with said support carried direction control switch, a slide carried speed control switch in said circuit, indexible elements having means to actuate said slide carried switches selectively in correlation to the different operative steps of the work cycle, and mechanical operative connections between said indexible member and said indexible elements for indexing said elements in correlation to the indexing movement of said member.

6. In a machine tool, a support, a rotatable spindle and a slide both carried by said support, an indexible member carried by said slide, said spindle and said member being adapted to carry work and tools, a multispeed power drive for rotating said spindle at different speeds in opposite directions, and an electrical control for said drive including a control circuit, a support carried direction control switch in said circuit for effecting change in direction of rotation of said spindle, cooperating means on said slide and support for actuating said switch at a predetermined point in the movement of the slide, a slide carried direction control switch in said circuit in series with said support carried direction control switch, a slide carried speed control switch in said circuit, actuating means for said slide carried switches and including indexible elements corresponding in number to said slide carried switches and each provided with a plurality of switch actuating members corresponding in number to the operative steps of the work cycle and presettable in correlation to said different operative steps to either an active or an inactive position, and mechanical operative connections between said indexible elements and said indexible member for indexing said elements in correlation to the indexing movement of said indexible member.

7. In a machine tool, a support, a rotatable spindle and a slide having feeding and idle movements relative thereto and both carried by said support, an indexible member carried by said slide, said spindle and said member being adapted to carry work and tools, a power drive for rotating said spindle in opposite directions, and a control for said drive including an electrical control circuit, a support carried start and stop control switch in said circuit for effecting the starting and stopping of the rotation of the spindle, cooperating means on said slide and support for actuating said switch at a predetermined point in the idle movement of the slide, a support carried direction control switch in said circuit for effecting change in direction of rotation of said spindle, cooperating means on said slide and support for actuating said direction control switch at a predetermined point in the feeding movement of the slide, a slide carried start and stop control switch in said circuit in series with said support carried start and stop control switch, a slide carried direction control switch in said circuit in series with said support carried direction control switch, actuating means for said slide carried switches and including indexible elements corresponding in number to said slide carried switches and each provided with a plurality of switch actuating members corresponding in number to the operative steps of a work cycle and presettable in correlation to said different operative steps to either an active or an inactive position, and mechanical operative connections between said indexible elements and said indexible member for indexing said elements in correlation to the indexing movement of said indexible member.

8. In a machine tool, a support, a rotatable spindle and a slide having feeding and idle movements relative thereto and both carried by said support, an indexible member carried by said slide, said spindle and said member being adapted to carry work and tools, a multispeed power drive for rotating said spindle at different speeds in opposite directions, a control for said drive including an electrical control circuit, a support carried start and stop control switch in said circuit for effecting starting and stopping of the rotation of said spindle, cooperating means on said slide and support for actuating said switch at a predetermined point in the idle movement of the slide, a support carried direction control switch in said circuit for effecting change in direction of rotation of said spindle, cooperating means on said slide and support for actuating said direction control switch at a predetermined point in the feeding movement of the slide, a slide carried start and stop control switch in said circuit in series with said support carried start and stop control switch, a slide carried direction control switch in said circuit in series with said support carried direction control switch, a slide carried speed control switch in said circuit for varying the speed of rotation of said spindle, indexible elements having means for actuating said slide carried switches selectively in correlation to the different operative steps of the work cycle, and mechanical operative connections between said indexible member and said elements for indexing said elements in correlation to the indexing movement of said member.

9. In a machine tool, a support, a rotatable spindle and a slide having feeding and idle movements relative thereto and both carried by said support, an indexible member carried by said slide, said spindle and said member being adapted to carry work and tools, a multispeed power drive for rotating said spindle at different speeds in opposite directions, and a control for said drive including an electrical control circuit, a support carried start and stop control switch in said circuit for effecting starting and stopping of the rotation of said spindle, cooperating means on said slide and support for actuating said switch at a predetermined point in the idle movement of the slide, a support carried direction control switch in said circuit for effecting a change in direction of rotation of said spindle, cooperating means on said slide and support for actuating said direction control switch at a predetermined point in the feeding movement of the slide, a slide carried start and stop control switch in said circuit in series with said support carried start and stop control switch, a slide carried direction control switch in said circuit in series with said support carried direction control switch, a slide carried speed control switch in said circuit for varying the speed of rotation of said spindle, actuating means for said slide carried switches and including indexible elements corresponding in number to said slide carried switches and each provided with a plurality of switch actuating members corresponding in number to the operative steps of the work cycle and presettable in correlation to said different operative steps to either an active or an inactive position, and mechanical operative connections between said indexible elements and said indexible member for indexing said elements in correlation to the indexing movement of said indexible member.

10. In a machine tool, a support, a rotatable spindle and a slide having feeding and idle movement relative thereto and both carried by said support, an indexible member carried by said slide, said spindle and said member being adapted to carry work or tools, an indexible stop roll carried by said slide and provided with adjustable stop screws corresponding in number to the operative steps of the work cycle, an operative connection between said indexible member and said stop roll for indexing the latter in timed relation to the indexing of said indexible member, a multispeed power drive for rotating said spindle in opposite directions, a control for said drive including an electrical control circuit, a support carried start and stop control switch in said circuit for effecting starting and stopping of the rotation of said spindle, cooperating means on said slide and support for actuating said switch at a predetermined point in the idle movement of the slide, a support carried direction control switch in said circuit for effecting change in direction of rotation of said spindle, means carried by said support and cooperating successively with said stop screws during the different operative steps of the work cycle for actuating said direction control switch at predetermined points in the feeding movements of the slide, a slide carried start and stop control switch in said circuit in series with said support carried start and stop control switch, a slide carried direction control switch in said circuit in series with said support carried direction control switch, a slide carried speed control switch in said circuit for varying the speed of rotation of said spindle, indexible elements having means for actuating said slide carried switches selectively in correlation to the different operative steps of the work cycle, and mechanical operative connections between said indexible stop roll and said indexible elements for indexing said elements in correlation to the indexing movements of said stop roll and said indexible member.

11. In a machine tool, a support, a rotatable spindle and a slide having feeding and idle movements relative thereto and both carried by said support, an indexible member carried by said slide, said spindle and said member being adapted to carry work or tools, an indexible stop roll carried by said slide and provided with adjustable stop screws corresponding in number to the operative steps in the work cycle, operative connections between said indexible member and stop roll for indexing the latter in timed relation to the indexing movement of said member, a multispeed power drive for rotating said spindle in opposite directions, a control for said drive including an electrical control circuit, a support carried start and stop control switch in said circuit for effecting the starting and stopping of the rotation of said spindle, cooperating means on said slide and support for actuating said switch at a predetermined point in the idle movement of the slide, a support carried direction control switch in said circuit for effecting change in direction of rotation of said spindle, means carried by said support and cooperating with said stop screws for actuating said direction control switch at predetermined points in the feeding movements of the slide, a slide carried start and stop control switch in said circuit in series with said support carried start and stop control switch, a slide carried direction control switch in said circuit in series with said support carried direction control switch, a slide carried speed control switch in said circuit for varying the speed of rotation of said spindle, actuating means for said slide carried switches and including indexible elements corresponding in number to said slide carried switches and each provided with a plurality of switch actuating members corresponding in number to the operative steps of the work cycle and presettable in correlation to said different operative steps to either an active or an inactive position, and a mechanical operative connection between said indexible stop roll and all of said indexible elements to index the latter in correlation to the indexing movement of said stop roll and said indexible member.

12. In a machine tool, a support, a rotatable spindle and a slide and both carried by said support, an indexible member carried by said slide, said spindle and said member being adapted to carry work or tools, a power drive for rotating said spindle, braking means for said drive and spindle and normally spring applied, a solenoid operatively associated with said braking means and when energized holding said braking means released, an electrical control for starting and stopping said power drive and for energizing and deenergizing said solenoid and including an electrical control circuit in which said solenoid is located, a support carried start and stop control switch in said circuit for effecting the starting and stopping of said power drive and the energization and deenergization of said solenoid, cooperating means on said slide and support for actuating said switch at a predetermined point in the movement of the slide, a slide carried start and stop control switch in said circuit in series with said support carried start and stop control switch, an indexible element having means for actuating said slide carried start and stop control switch selectively in correlation to the different operative steps of the work cycle, mechanical operative connections between said indexible member and said element for indexing said element in correlation to the indexing movement of said member, an auxiliary control circuit for energizing and deenergizing said solenoid when said start and stop control switches are both in the stop position, and contact means carried by said spindle and acting during each revolution of the spindle in its coasting movement to close said auxiliary circuit for the major portion of each said revolution to energize said solenoid and maintain said braking means released and then to open said auxiliary circuit momentarily to deenergize said solenoid and apply said braking means to stop said spindle in a predetermined position.

ROBERT H. CLARK.